US011669601B2

(12) United States Patent
Jalali et al.

(10) Patent No.: US 11,669,601 B2
(45) Date of Patent: Jun. 6, 2023

(54) DIGITAL WATERMARKING FOR TEXTUAL DATA

(71) Applicant: Huawei Cloud Computing Technologies Co., Ltd., Guizhou (CN)

(72) Inventors: Roozbeh Jalali, Markham (CA); Haolin Guo, Markham (CA); Wen Chen, Markham (CA); Michael Chih Hung Li, Markham (CA); Zanqing Zhang, Markham (CA)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 314 days.

(21) Appl. No.: 17/025,684

(22) Filed: Sep. 18, 2020

(65) Prior Publication Data

US 2022/0092157 A1    Mar. 24, 2022

(51) Int. Cl.
*G06F 21/16*    (2013.01)
*H04L 9/08*     (2006.01)
*G06F 40/177*   (2020.01)

(52) U.S. Cl.
CPC ............ *G06F 21/16* (2013.01); *H04L 9/0894* (2013.01); *G06F 40/177* (2020.01); *G06F 2221/0737* (2013.01); *H04L 2209/08* (2013.01)

(58) Field of Classification Search
CPC ................... G06F 21/16; G06F 40/177; G06F 2221/0737; H04L 9/0894; H04L 2209/08; H04L 2209/608
See application file for complete search history.

(56) References Cited

U.S. PATENT DOCUMENTS 6,813,368 B1 * 11/2004 Khanna .............. H04N 1/32229
                                                  713/176
9,411,785 B1 *  8/2016 Wong ..................... G06F 40/126
(Continued)

FOREIGN PATENT DOCUMENTS

| CN | 110110540 A | 8/2019 |
| CN | 110457873 A | 11/2019 |
| CN | 110874456 A | 3/2020 |

OTHER PUBLICATIONS

Mittermeir et al., Protecting Spreadsheets against Fraud, arXiv, 2008.*

(Continued)

*Primary Examiner* — David Garcia Cervetti

(57) ABSTRACT

Methods and system for embedding digital watermark information into textual data arranged in a table of cells are provided. A first subset of cells are selected and for each primary cell key and cell partition number are determined. A portion of a digital watermark ID code is embedded at an embedding position determined based on the partition number. Methods and systems for extracting digital watermark information from the textual data are also provided. A cell is fetched from the table and the presence of portion of the digital watermark ID code is determined. A primary cell key and cell partition number are determined. A portion of the digital watermark ID code is extracted at the embedding position within the cell, the embedding position determined based on the cell partition number. The digital watermarking systems and methods provide tracking for unauthorized copying of the data while modifying only a subset of the data.

18 Claims, 17 Drawing Sheets

(56) References Cited

U.S. PATENT DOCUMENTS

| | | | |
|---|---|---|---|
| 11,003,747 B2* | 5/2021 | Coleman | G06F 21/6218 |
| 2004/0001606 A1* | 1/2004 | Levy | G06K 15/1831 |
| | | | 382/100 |
| 2006/0095775 A1* | 5/2006 | Jajodia | G06F 21/64 |
| | | | 713/176 |
| 2008/0292129 A1* | 11/2008 | Fan | G06F 40/169 |
| | | | 382/100 |
| 2010/0128290 A1* | 5/2010 | Fan | B42D 25/29 |
| | | | 358/1.9 |
| 2010/0128299 A1* | 5/2010 | Fan | H04N 1/32229 |
| | | | 358/1.14 |
| 2013/0114847 A1* | 5/2013 | Petrovic | G06V 30/1914 |
| | | | 382/100 |
| 2013/0114848 A1* | 5/2013 | Petrovic | G06F 18/28 |
| | | | 382/100 |
| 2014/0153715 A1* | 6/2014 | Georgiev | G09C 1/00 |
| | | | 380/28 |
| 2017/0329943 A1* | 11/2017 | Choi | G06F 21/10 |
| 2019/0034601 A1* | 1/2019 | Coleman | G06F 16/00 |
| 2019/0095595 A1* | 3/2019 | Coleman | G06N 20/00 |
| 2019/0294763 A1* | 9/2019 | Coatrieux | G06F 21/6218 |
| 2019/0354711 A1* | 11/2019 | Coatrieux | G06F 21/6227 |
| 2021/0026598 A1* | 1/2021 | Zinsmeyer | G06F 21/16 |
| 2021/0092255 A1* | 3/2021 | Xu | H04N 1/32219 |
| 2021/0173903 A1* | 6/2021 | Choudhury | G06F 16/2255 |
| 2021/0326414 A1* | 10/2021 | Coleman | G06F 21/604 |

OTHER PUBLICATIONS

Kamran et al., A Comprehensive Survey of Watermarking Relational Databases Research, arXiv, Jan. 2018.*

Kamaruddin et al., A Review of Text Watermarking: Theory, Methods, and Applications, IEEE, Mar. 2018.*

Frost, Raymond; Matta, Vic; and Kenyo, Lauren, "Plagiarism Prevention in Excel Assignments" (2018). Proceedings of the 2018 Pre-ICIS SIGDSA Symposium. 8.*

Churi et al., Alphanumeric Database Security through Digital Watermarking, IEEE, Feb. 2020.*

Melkundi et al., A Robust Technique for Relational Database Watermarking and Verification, IEEE, 2015.*

Jie Guo, Fragile Watermarking Scheme for Tamper Detection of Relational Database, IEEE, 2011.*

Zhang et al., Relational Databases Watermarking for textual and numerical data, IEEE, 2011.*

Rui, X. et al. "A Multiple Watermarking Algorithm for Texts Mixed Chinese and English" Procedia Computer Science, vol. 17, pp. 844-851, 2013.

Deshpande, A. et al. "New Watermarking Technique for Relational Databases," 2009 Second International Conference on Emerging Trends in Engineering & Technology, pp. 664-669, 2009.

Ma, Y.-J et al. "A novel reversible watermarking scheme for relational databases protection based on histogram shifting". Journal of Information Hiding and Multimedia Signal Processing. vol. 7, pp. 266-276. 2016.

* cited by examiner

DIGITAL WATERMARKING FOR TEXTUAL DATA

RELATED APPLICATIONS

This is the first application filed for the instantly disclosed technology.

TECHNICAL FIELD

The present application relates to a system and method for digital watermarking of textual data.

BACKGROUND

With the rapid growth of data, and the sharing of data between parties, interest has grown in watermarking systems that can used to provide copyright protection of data, prove ownership of the data, and trace the source of data leakage. Digital watermarking typically involves changing existing data or adding additional data to digital content in a covert manner that allows a copy of a digital content to be traced to a source and/or authenticated. However, data analysis such as traditional statistical approaches or recent Machine Learning based approaches require high integrity of the data because modifications to the data may lead to significantly different analysis results. Accordingly, any digital watermarking applied should be done in a manner that preserves the integrity of the data for analytical purposes.

Existing research conducted on digital watermarking of textual data mostly focuses on file-level watermarks. File-level watermarking, involves watermarking an entire file (e.g., a document file or a worksheet file) before transferring the file to another party. File-level watermarking is vulnerable to subset attacks in which a subset of the original data set may be copied or leaked without damaging the file-level watermark.

In the case of unstructured textual data, syntactic and semantic digital watermarking can be applied which exploits the syntactic structure of sentences. However, both syntactic and semantic watermarking techniques are more suitable for unstructured text (e.g., sentence based text) because they rely on context to analyze the syntactic or semantic structure of the text. For structured textual data, syntactic and semantic techniques are not practical because a database table may contain groups of alphanumeric values that do not have interconnections to each other.

In the case of structured textual data where data is arranged in units such as cells of tabular data, digital watermarks have been proposed. In cell-level watermarking, a watermark is embedded into the structured data cells thus making it difficult to copy and leak subsets of the data in a manner that is untraceable. Database watermarking for structural textual data have been proposed that rely on techniques such as Least Significant Bits (LSB), content analysis, and partitioning to embed and extract a watermark that is resilient to typical watermark attacks such as: modification, subset, re-typing etc. However, known solutions depend on primary key attribute of the database table in a partitioning algorithm. The primary key attribute is often used to compute a partition number that represents the partition assigned to a given cell. This reliance is vulnerable to deletion or alteration attacks because it is not difficult to identify and delete the primary key column. A deletion attack involves an attacker deleting part of the data. An alteration attack involves modifying some records of the data to destroy or remove the watermark.

Additionally, existing structured textual data watermarking solutions can substantially alter the subject overall data content. FIG. 1A depicts a portion of structured textual data 10 in comma-separated value (CSV) format in which the cells or fields of a database table are delineated by commas. FIG. 1B depicts the structured textual data of FIG. 1A after a typical digital watermarking method has been applied thereto. As can be seen with reference to the fields 1, 3, 5, and 7, the data has been altered when the values in FIG. 1B are compared with the values for the corresponding fields in FIG. 1A. Significant changes have been made to the data, which is undesirable as a high volume of changes can negatively impact the usefulness of the data for statistical analysis or machine learning based analysis.

Accordingly, it is desirable to provide an improved system and method for digital watermarking of structured textual data.

SUMMARY

In accordance with an aspect of the present disclosure, there is provided a method for embedding a digital watermark in structured textual data arranged in a table of cells that each contain a respective set of textual data characters. The method comprises electing a first subset of the cells for watermarking. For each of the cells in the first subset of cells the method includes determining a primary cell key for the cell based on one or more of the textual data characters contained in the cell, determining a cell partition number for the cell based on the primary cell key, and embedding a portion of a first digital watermark ID code at an embedding position within the cell, the portion being determined based on the cell partition number.

In accordance with the previous aspect, the primary cell key is determined based on a combination of at least one of the textual data characters contained in the cell and the number of textual data characters contained the cell.

In accordance with any of the preceding aspects, the cell partition number for the cell is determined also based on a secret key that is common for all of the cells in the first subset of cells.

In accordance with any of the preceding aspects, determining the embedding position within the cell is based on the secret key and the length of the textual data in each cell.

In accordance with any of the preceding aspects, the cells are arranged in an array of columns and rows, wherein selecting a first subset of the cells for watermarking comprises selecting a first subset of rows of cells of the array, wherein each of the cells in the rows of the selected subset are included in the first subset of the cells.

In accordance with any of the preceding aspects, the first digital watermark ID code is comprised of a plurality of visible characters, the portion of the first digital watermark ID code comprises at least one of the plurality of visible characters, and embedding the portion of the first digital watermark ID code comprises replacing a portion of the textual data characters contained in the cell with the portion of the first digital watermark ID code.

In accordance with the previous aspect, for each of the cells in the first subset of cells, the method further comprises replacing the last character of the textual data characters in the cell with a noise key character selected based on the cell partition number from a noise key index that is common for all of the cells in the first subset of cells.

In accordance with some of the preceding aspects, the first digital watermark ID code is comprised of a plurality of invisible characters, the portion of the first digital watermark ID code comprises at least one of the plurality of invisible characters, and embedding the portion of the first digital watermark ID code comprises inserting the portion of the first digital watermark ID code into the textual data characters contained in the cell.

In accordance with any of the preceding aspects, the method further comprises selecting a second subset of the cells for watermarking. For each of the cells in the second subset of cells, the method further includes determining a primary cell key for the cell based on one or more of the textual data characters contained in the cell; determining a cell partition number for the cell based on the primary cell key; embedding a portion of a second digital watermark ID code at an embedding position within the cell, the portion being determined based on the cell partition number. The first digital watermark ID code and the second digital watermark ID code each map to a same authorized recipient identifier.

In accordance with any of the preceding aspects, the method further comprises inserting a noise column in the table, the noise column comprising a plurality of cells each containing first digital watermark ID code in encrypted form.

In accordance with another aspect of the present disclosure, there is provided a method for extracting digital watermark information from textual data that is arranged in cells that each contain a respective set of textual data characters. The method comprises fetching a cell from the cells of the textual data, determining that the cell contains a portion of a digital watermark ID code embedded therein determining a primary cell key for the cell based on one more of the textual data characters contained in the cell, determining a cell partition number for the cell based on the primary cell key, extracting a portion of a first digital watermark ID code at an embedding position within the cell, the portion being determined based on the cell partition number, and repeating these steps for other cells until the digital watermark ID code is fully extracted.

In accordance with the preceding aspect, the first digital watermark ID code is comprised of a plurality of visible characters. In this example, determining that the cell contains the portion of the digital watermark is embedded therein comprises locating a noise key character at a predetermined position, the noise key character selected, based on the cell partition number, from a noise key index that is common for all of the cells.

In accordance with some of the preceding aspects, the first digital watermark ID code is comprised of a plurality of invisible characters and the step of determining that the cell contains the portion of the digital watermark is embedded therein comprises locating the portion of the first digital watermark ID code corresponding to the cell partition number at the embedding position.

In accordance with any of the preceding aspects, the primary cell key is determined based on a combination of at least one of the textual data characters contained in the cell and the number of textual characters contained in the cell.

In accordance with any of the preceding aspects, the cell partition number is determined also based on a secret key that is common to all of the cells.

In accordance with any of the preceding aspects, determining the embedded position within the cell based on the secret key and the length of the textual data in the cell.

In accordance with any of the preceding aspects, the method for extracting digital watermark information from textual data further comprises locating a noise column in the table, the noise column comprising a plurality of cells each containing first digital watermark ID code in encrypted form, and decrypting the first digital watermark ID code to extract the first digital watermark ID code.

In another aspect of the present disclosure, there is provided a computer system comprising a processor and a non-transitory memory coupled to the processor, the memory storing instructions that, when executed by the processor, configure the computer system to perform the method of any one of the preceding aspects.

In yet another aspect of the present disclosure, there is provided a computer program product comprising a non-transitory computer medium storing instructions for configuring a computer system to perform the method of any one of the preceding aspects.

The disclosed watermarking systems and methods, in at least some applications, provide one or more of the following features: preserve the usability of the watermarked data for advanced data analytics by one or both of modifying only negligible amounts of the original data and/or embedding only noise into the original data; enable a large number of unique watermarks; remove dependence on any primary key, thereby providing resistance to a primary key deletion attack; and enable blind extraction of the digital watermarks such that the original data is not required for extraction.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. Though aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, and systems for digital watermarking of structured textual data.

Example embodiments are disclosed herein that provide methods and systems for watermarking structured textual data to enable one or more of data leakage traceability, copyright protection and source authentication during the lifecycle of the data. As will be described in detail below, the disclosed watermarking systems and methods are configured to, in at least some applications, provide one or more of the following features: preserve the usability of the watermarked data for advanced data analytics by one or both of modifying only negligible amounts of the original data and/or embedding only noise into the original data; enable a large number of unique watermarks; remove dependence on any primary key, thereby providing resistance to a primary key deletion attack; and enable blind extraction of the digital watermarks such that the original data is not required for extraction.

Embedding System and Process

Figure 1A:
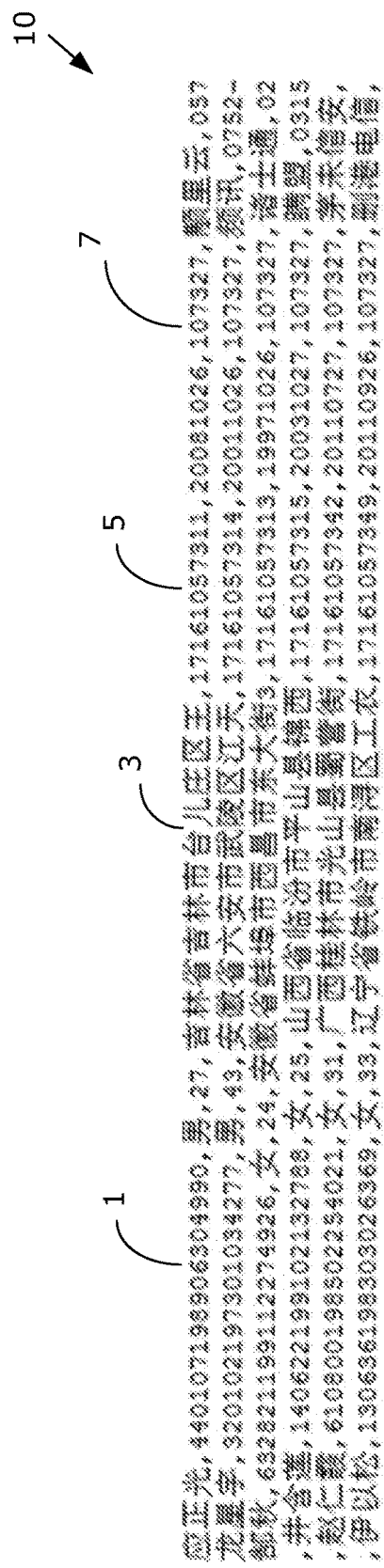
FIG. 1A illustrates structured textual data in comma separated value (CSV) tabular data format.
Figure 1B:
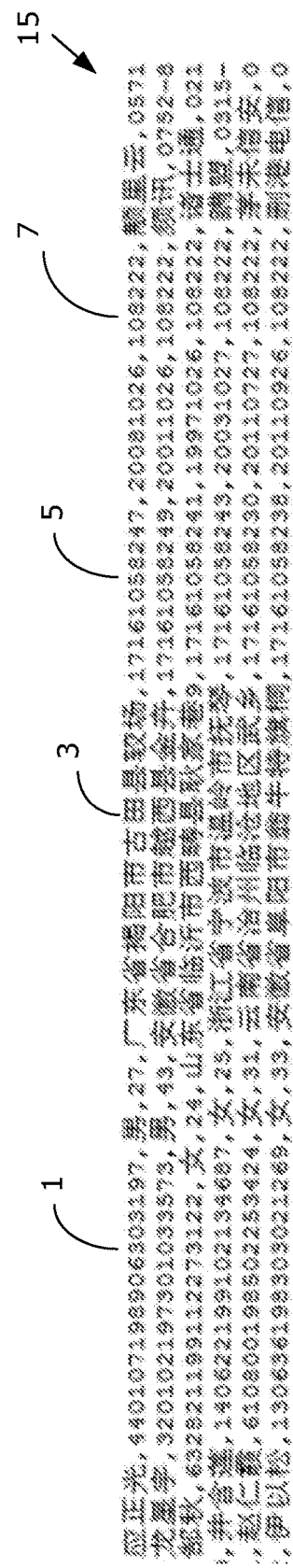
FIG. 1B illustrates embedded digital watermarking characters in the structured textual data of FIG. 1A.
Figure 2:
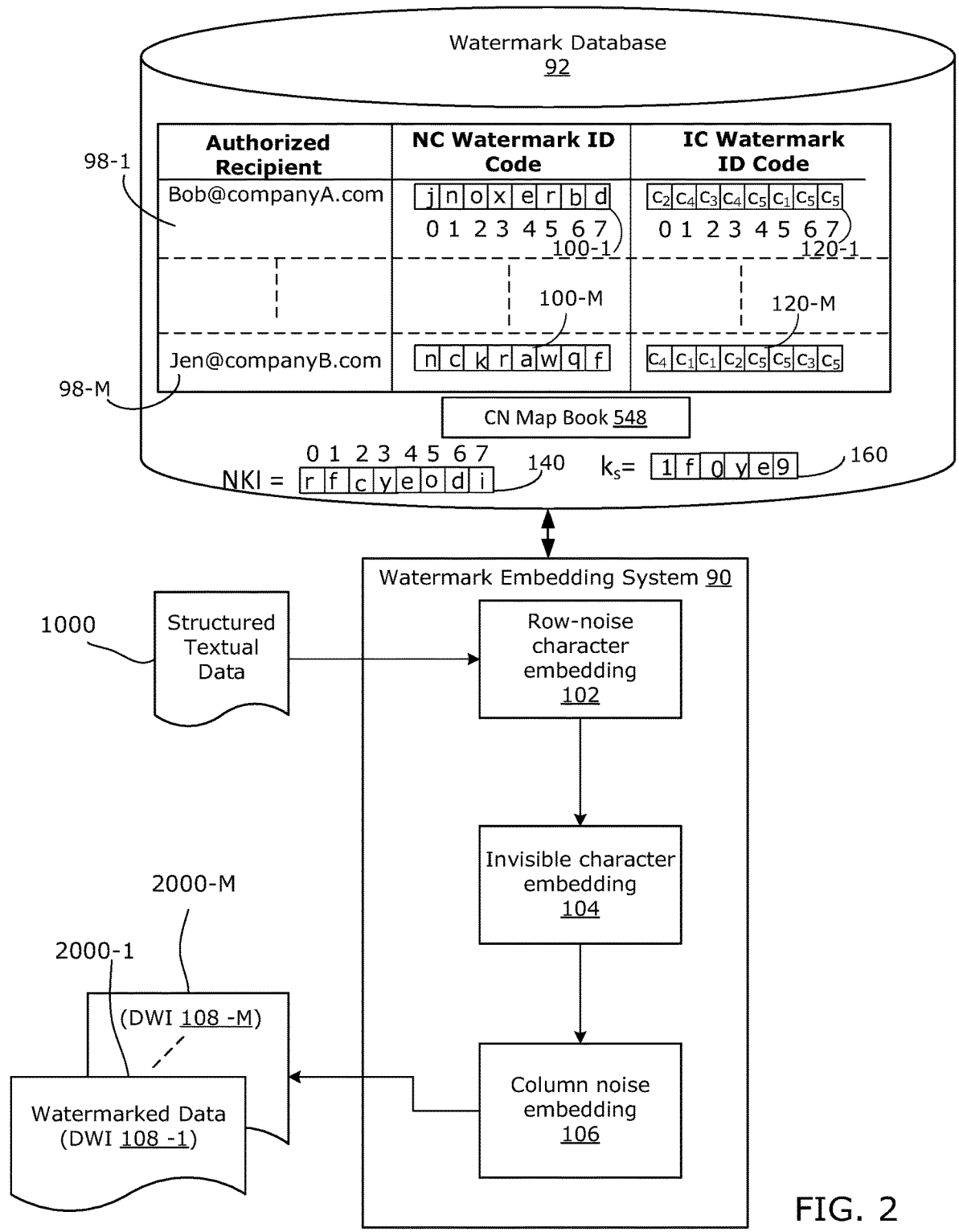
FIG. 2 is a block diagram of a digital watermarking embedding system for structured textual data, in accordance with an example embodiment.

By way of example, FIG. 2 depicts an example of a digital watermark embedding system 90 that may be implemented by a digital processing system 3000 (described below). Watermark embedding system 90 is configured to receive, as input, structured textual data 1000 (which may for example be a digital file) and embed unique digital watermark information (DWI) 108-1 to 108-M into M respective copies of the structured textual data 1000, generating M respective watermarked data versions 2000-1 to 2000-M (each version may for example be a respective digital file intended for a respective authorized recipient). Digital watermarking embedding system 90 can include a number of engines for performing respective watermark embedding sub-processes on the structured textual data 1000, including: a row-noise character embedding engine 102 for performing row-noise character embedding sub-process 300; an invisible character embedding engine 104 for performing an invisible character embedding sub-process 400; and a column-noise embedding engine 106 for performing a column-noise embedding process 500. In some examples, some of the engines 102, 104 and 106 may be omitted or placed in a different order than shown. The individual engines 102, 104 and 106 and respective sub-processes 300, 400, 500 will be described in detail below.

As used here, an "engine" can refer to a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit. In example embodiments, each of the engines 102, 104 and 106 may be implemented by respective machine-readable instructions executing on a common hardware processing circuit.

In at least some example embodiments, the digital watermark information 108-1 to 108-M that is embedded in each watermarked data version 2000-1 to 2000-M can be mapped to a unique recipient, for example to an intended or authorized recipient, of the watermarked data version 2000-z (where z represents a generic one of the watermarked data versions 2000-1 to 2000-M). For example, in FIG. 2, watermark embedding system 90 stores, or has access to, a watermark database 92 that includes a list of authorized recipient identifiers 98-1 to 98-M, along with a respective pair of unique watermark ID codes for each of the authorized recipient identifiers 98-1 to 98-M. In particular, each recipient identifier 98-1 to 98-M is associated with a respective unique noise character (NC) watermark ID code 100-1 to 100-M, and each recipient identifier 98-1 to 98-M is also associated with a respective unique invisible character (IC) watermark ID code 120-1 to 120-M. As will be explained in greater detail below, the digital watermark information 108-1 to 108-M stored in each watermarked data version 2000-1 to 2000-M embeds both a respective unique NC watermark ID code 100-1 to 100-M and a respective unique IC watermark ID code 120-1 to 120-M, providing two different watermark ID codes that both map back to a respective authorized recipient identifier 98-1 to 98-M. As will be explained in greater detail below, each of the NC watermark ID codes 100-1 to 100-M and IC watermark ID codes 120-1 to 120-M include a plurality of characters that are to 120-M are divided into partitions or subsets.

NC watermark ID codes 100-1 to 100-M are made up of multiple characters (e.g., "m" characters) that can be visibly rendered (e.g., non-zero width characters that take up a display space) on a display output or print output. In an example embodiment, each NC watermark ID code 100-1 to 100-M is 8-characters in length (e.g., m=8), which each character being selected from the lowercase English-language alphabet visible character set {a, . . . , z}. Accordingly, each character has 26 possible values, providing $26^8$ possible unique NC watermark ID codes that can each be mapped to a respective authorized recipient. In various example configurations, the character length used for NC watermark ID codes may alternatively be less than or greater than 8 characters, and the set of noise characters from which the NC watermark code IDs are selected may include other visible characters instead of, or in addition to, the lowercase English-language alphabet visible character set {a, . . . , z}. In some examples, the type of characters used for NC watermark code IDs may be selected based on the type of data that is being embedded with the NC watermark code IDs. For example, numeric codes can be used in the case of numeric data to better blend in with the remaining data.

IC watermark ID codes 120-1 to 120-M are each made up of multiple hidden or invisible characters that will not be visibly rendered on a display output or print output. For example, such characters can include zero-width control characters that are typically used by word processing applications to wrap lines, break paragraphs, and space words in a specific way, but which have no meaning in the context of the database table 180. The invisible characters take up storage space within the textual data, but when the textual data is rendered the invisible characters are "zero-width" characters that are not visible. In the illustrated example, each IC watermark ID code 120-1 to 120-M includes the same number of characters as each NC watermark ID code (e.g., "m" characters), however in alternative configurations the NC watermark ID codes can include a different numbers of characters than the IC watermark ID codes. In the depicted example, each character of an IC digital watermark code 120-1 to 120-M is selected from an invisible character set comprised of a set of invisible characters. In an illustrative embodiment the set of invisible characters may for example include 5 possible characters, represented as $\{c_1, c_2, c_3, \ldots c_4, c_5\}$. Accordingly, each invisible character of the IC watermark ID code can take 5 possible values. Therefore, in the illustrated example where m=8, there are $5^8$ (approximately 309,000) possible unique values for the IC watermark ID codes 120-1 to 120-M.

In various example configurations, the number of possibilities can be increased by increasing the character length of the IC watermark ID code and/or increasing the number of invisible characters in the set from which the characters are selected. Similarly, the number of possibilities can be decreased by reducing the character length of the IC watermark ID code and/or reducing the number of invisible characters in the set from which the characters are selected.

Recipients are identified in watermark database 92 by mapping respective pairs of NC and IC watermark ID codes 100-1, 120-1 to 100-M, 120-M to respective email addresses that are used as authorized recipient identifiers 98-1 to 98-M. For example, in watermark database 92 of FIG. 2, the NC watermark ID code 100-1 ("jnoxerbd") and the IC watermark ID code 120-1 ("$c_2c_4c_3c_4c_5c_1c_5c_5$"), each map to respective authorized recipient identifier 98-1 ("Bob@companyA.com"). In example embodiments, the NC and IC watermark ID codes assigned to a respective authorized recipient identifier may be randomly assigned or may, in alternative examples embodiments, be assigned in a determinative manner. Although email addresses are shown in FIG. 2 as an example of a unique authorized recipient identifiers, additional or substitute identifiers could also be used such as company name, username, contractor ID, etc.

As shown in FIG. 2, watermark database 92 also stores a secret key 160 ($K_s$) and a noise key index 140 (NKI) that is associated with structured textual data 1000. As will be explained in greater detail below, the secret key 160 ($K_s$) and noise key index 140 (NKI) associated with structured textual data 1000 are used when embedding and extracting digital watermark information 108-1 to 108-M to and from respective watermarked data versions 2000-1 to 2000-M. In the illustrated embodiment, secret key 160 ($K_s$) has a length of 6 alphanumeric textual characters, however its length can be different in different embodiments. In the illustrated embodiment, NKI 140 has a length that is the same as that of the NC watermark ID code (e.g., m characters). In example embodiments, watermark database 92 also stores a pre-populated column noise (CN) map book 548, which will be described in greater detail below.

Figure 3:
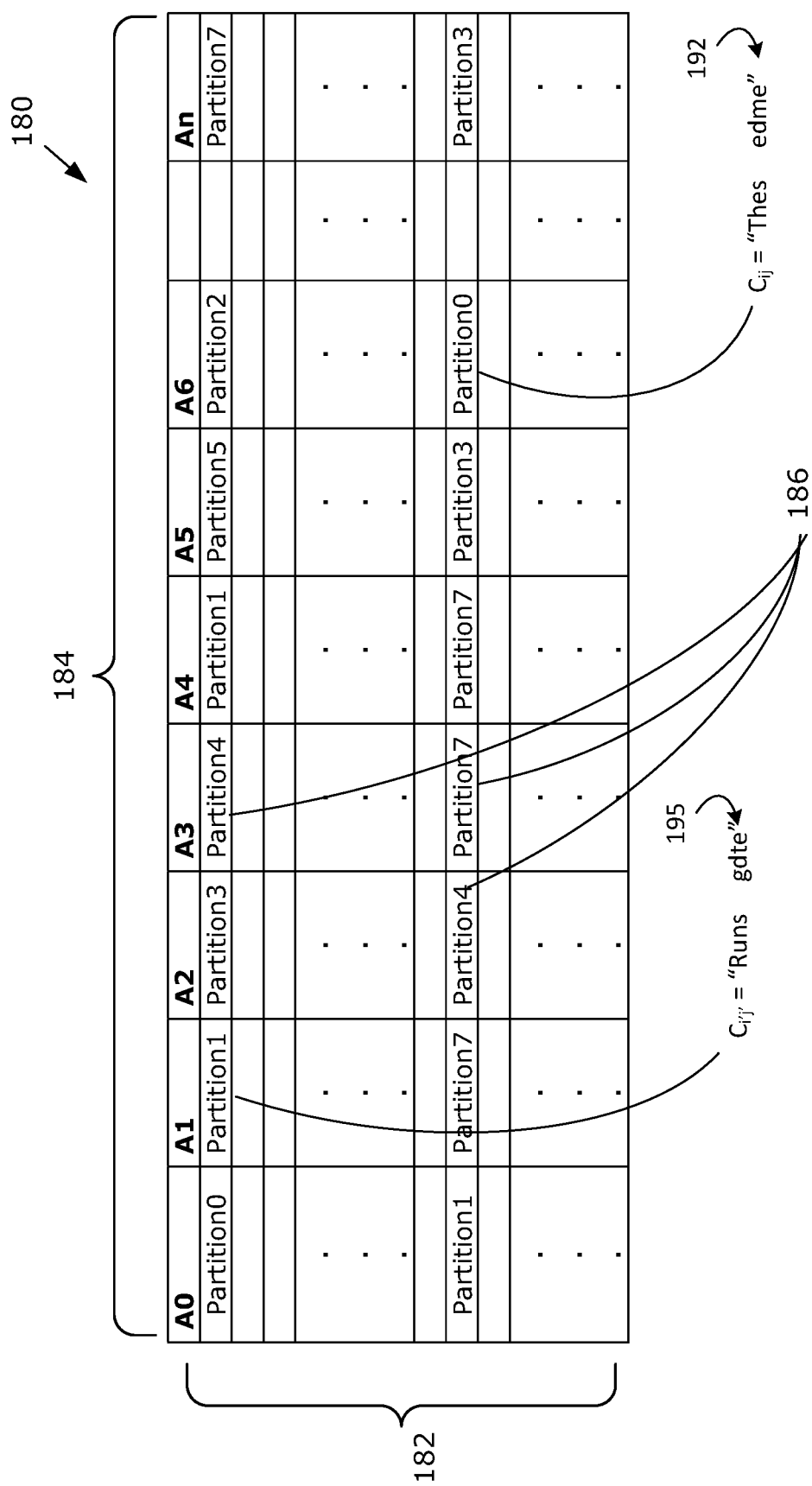
FIG. 3 depicts an example of tabular data showing partition numbers assigned to cells thereof.

In example embodiments, structured textual data 1000 can be arranged as tabular data 180 as shown in FIG. 3. The tabular data 180 is 2-dimensional, comprised of a plurality of rows 182 and columns 184. Each row is comprised of a plurality of data fields that are delimited into respective cells 186. Each table column 184 is comprised of a plurality of cells 186 of the same data field. In the current disclosure, rows 182 are denoted by the letter "i", and columns 184 are denoted by the letter "j" with a cell 186 in database table 180 being represented using the notation $C_{ij}$. The database table 180 may include a row of header cells that includes field labels, shown as "A0" to "An" in the illustrated embodiment. In example embodiments, structured textual data 1000 could include multiple sets of 2-dimensional tubular data 180 (e.g., multiple sheets or pages on the case of a spreadsheet file), and each respective set of 2-dimensional tabular data 180 may be subjected to watermarking in the manner described below. As known in the art, structured tubular data organized in rows and columns can be stored in different file formats such as CSV (mentioned above), as well as proprietary formats associated with specific suppliers of spreadsheet and database solutions.

The generation of a single watermarked data version 2000-1 that includes a database table 190 embedded with watermark information 108-1 corresponding to a single authorized recipient (for example Bob@companyA.com as indicated by authorized recipient identifier 98-1) will now be described. In this regard, the actions performed by row-noise character embedding engine 102, invisible character embedding engine 104 and column noise embedding engine 106 on structured textual data 1000 to generate watermarked digital data version 2000-1 are as follows.

Row-Noise Character Embedding

Figure 4:
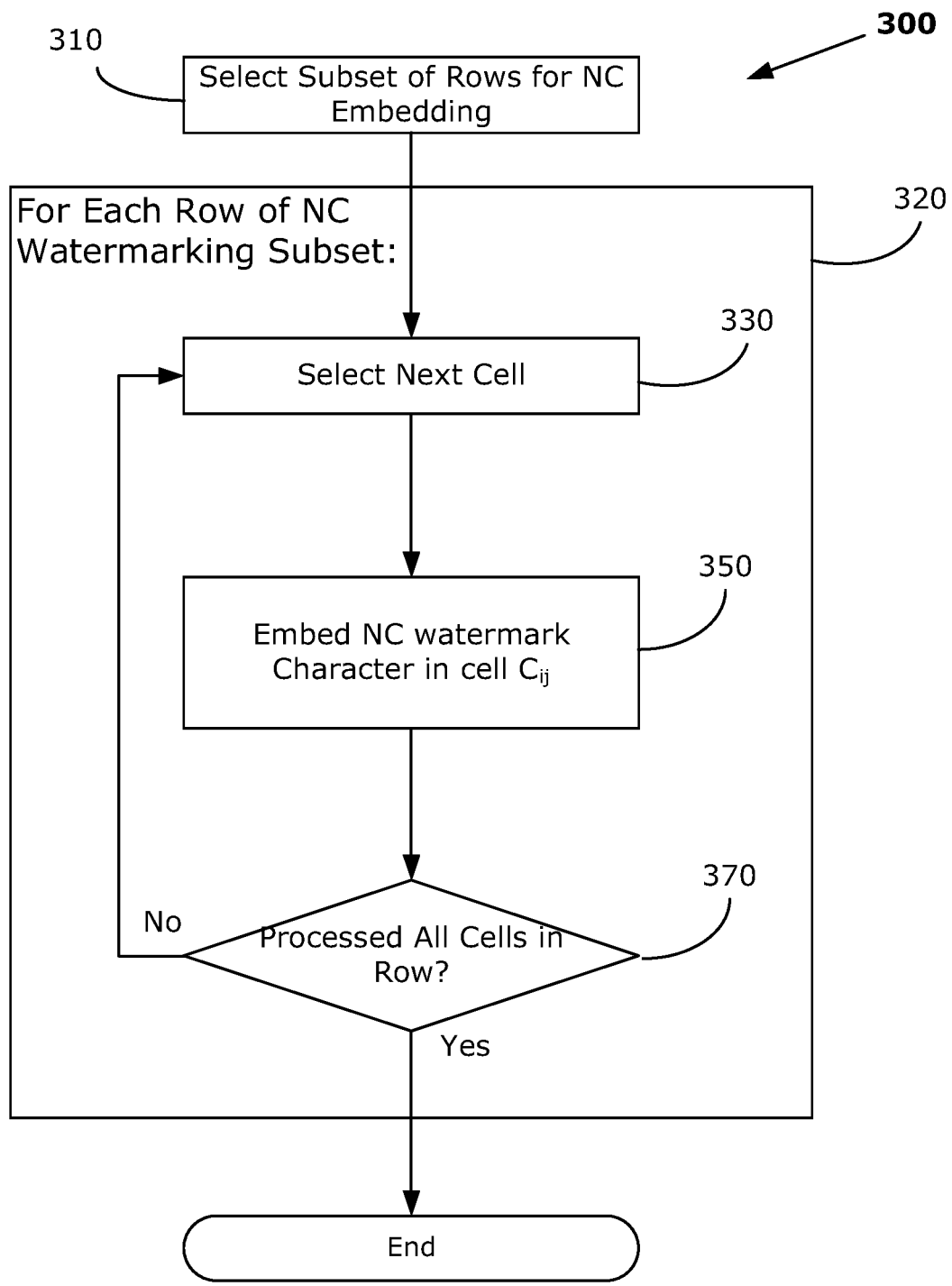
FIG. 4 is a flow chart depicting the steps for embedding row-noise watermarking characters into structured textual data, in accordance with example embodiments.

Referring to FIGS. 2 and 4, row-noise character embedding engine 102 is configured to embed characters from NC watermark ID code 100-1 into selected rows of data table 180 of structured textual data 1000-1 by applying sub process 300 as follows.

As indicated by block 310 in FIG. 4, row-noise character embedding engine 102 is configured to select a subset of rows 182 located throughout table 180 for NC watermarking. In example embodiments, the relative number of rows 182 included in the NC watermarking subset is predefined and may be a configurable parameter. For example, the number of rows 182 to be included in the NC watermarking subset could be set at a specified percentage (e.g., 5% in some examples, up to 20% in other examples) of all rows in database table 180. In some example embodiments, the specified percentage of rows 182 may be selected in a deterministic manner (e.g., select every $20^{th}$ row in the case where the specified percentage is 5%), or in a random manner (e.g., randomly select rows until 5% have been selected in the case where the specified percentage is 5%). Scattering the rows 182 containing embedded watermarking characters throughout the database table 180 can make it difficult for an attacker to copy parts of the database table 180 without also copying parts that embed the NC watermark 100-1. At the same time, because only a small percentage of the rows of database table 180 contain the embedded watermarking characters, the data within the database table 180 is not significantly altered so as to undermine its usefulness for statistical and/or machine learning based analysis.

As indicated in FIG. 4, once the NC watermarking row subset is selected (block 310), each row of that subset is then subjected to NC embedding process 320. Referring to blocks 330, 350 and 370, during NC embedding process 320, each of the cells 186 in a row are each embedded with a respective noise character selected from the NC watermark ID code 100-1.

Figure 5:
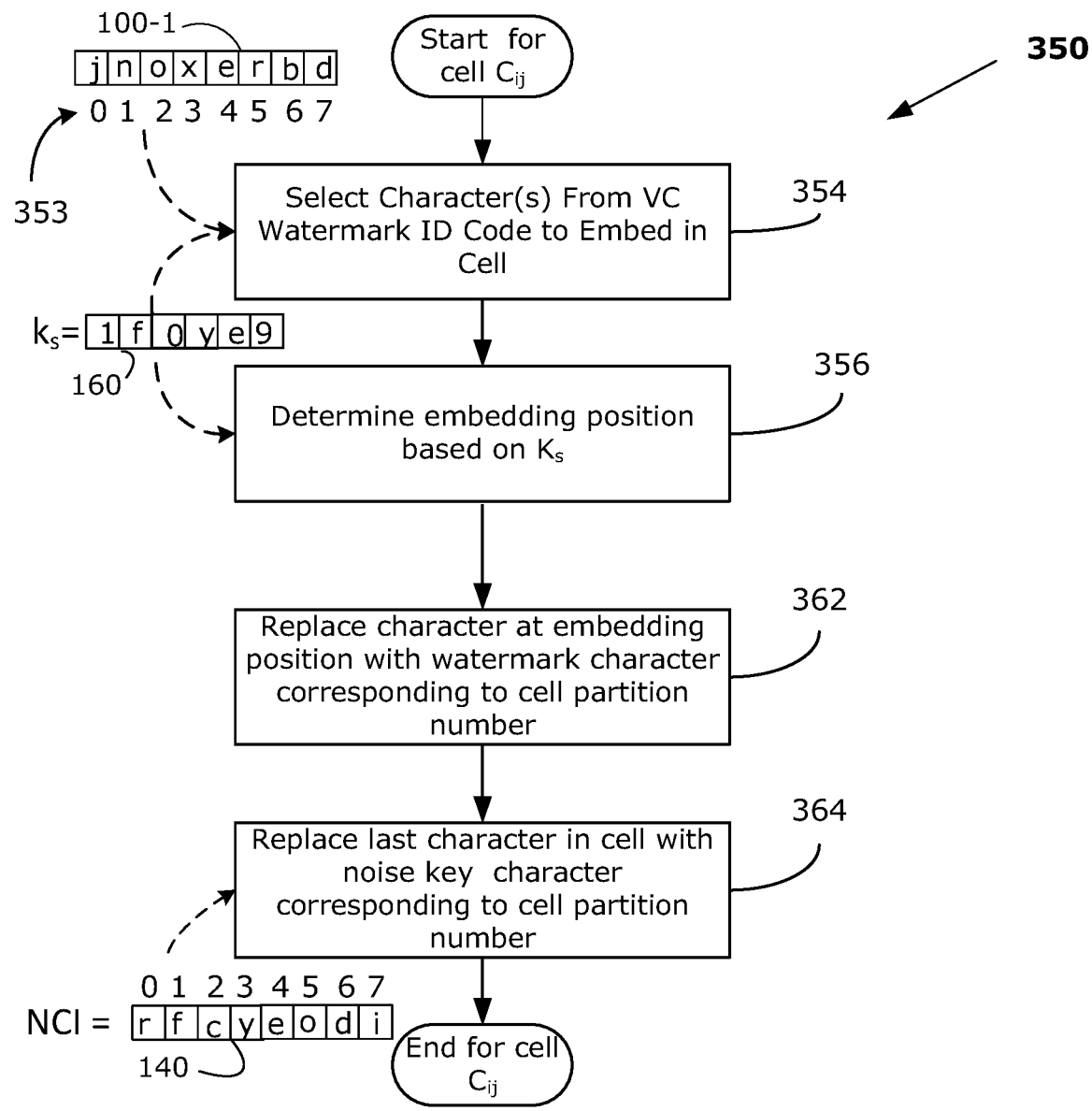
FIG. 5 is a flow chart depicting the steps for embedding a row-noise watermark character into a single cell of structured textual data, in accordance with example embodiments.
Figure 6:
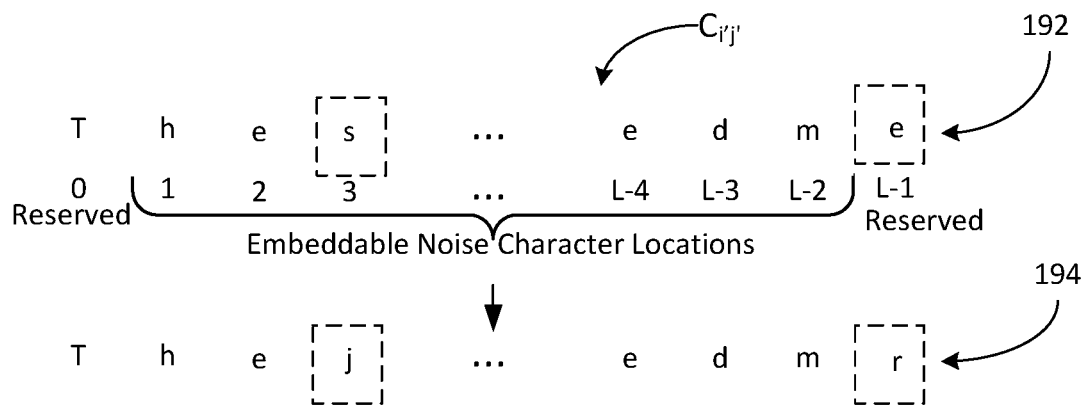
FIG. 6 is an example of textual data included in a tubular data cell before and after noise character embedding.

An illustrative example of sub-process 350 for embedding a noise character into a specific cell 186 (e.g., $C_{ij}$) is shown in greater detail in FIG. 5. For illustrative purposes, FIG. 6 shows an example of possible textual data 192 contained in cell $C_{ij}$ of tabular data 180 from structured textual data 1000 before embedding sub-process 350 and the corresponding textual data 194 contained in the same cell $C_{ij}$ after embedding sub-process 350. As illustrated in FIG. 6, in the resulting noise-embedded textual data 194, a portion of the original textual data 192 has been replaced with a portion of the text from the NC watermark ID code 100-1. In particular, the character "s" located in the 4th character location (e.g., position 3) of the original textual data 192 has been replaced with a noise character "j" from the NC watermark ID code 100-1 and the character "e" located in the final character location (e.g., position "L−1") of the original textual data 192 has been replaced with a noise key (NK) character "r" from NKI 140. In example embodiments, sub-process 350 generates noise-embedded textual data 194 as follows.

In example embodiments, in order to facilitate selection of a portion of NC watermark ID code 100-1 (e.g., noise character (e.g., character "j" in the illustrated example) for embedding in a specific cell 186, NC watermark ID code 100-1 is divided into partitions. In particular, the character locations of NC watermark ID code 100-1 are partitioned into portions or subsets that each include a defined number of character locations, with each subset being assigned a successive partition number 353. In the illustrated embodiment, the character locations of NC watermark ID code 100-1 are partitioned into subsets where the defined number of character locations per subset is one. In the illustrated example, each partition includes only a single character from the NC watermark ID code 100-1, thus each partition number 353 indexes a respective noise character for embedding into a cell 186. In other example configurations, other subset sizes could be used in embodiments where more than a single character from NC watermark ID code 100-1 is to be embedded in each cell.

Each partitioned subset of the NC watermark ID code 100-1 (e.g., each character location in the illustrated example where subset size=1) is assigned a respective partition number 353. Accordingly, in the illustrated example, the first character location (e.g., location of text character "j") in NC watermark ID code 100-1 is assigned a partition number equal to 0 (Partion0), the second character location (e.g., location of text character "n") is assigned a partition number equal to 1 (Partion1), and so on, with the mu' character location (e.g., location of text character "d") being assigned a partition number equal to m−1 (e.g., Partition7 in the illustrated case where m=8).

As indicated in block 354, the row-noise character embedding engine 102 selects content from the NC watermark ID code 100-1 to embed in the subject cell 180 ($C_{ij}$). In example embodiments, this selection is done by assigning a cell partition number to the subject cell 180 ($C_{ij}$), and then selecting the text character(s) from the location(s) of NC watermark ID code 100-1 that have been assigned the same partition number. In example embodiments, the cell partition number assigned to the subject cell 180 ($C_{ij}$) is determined based on content of the subject cell 180 ($C_{ij}$). In the illustrated example (i.e. the case where a single character from the NC watermark ID code 100-1 is embedded into the subject cell 180 ($C_{ij}$)), the following equation provides one example of how a cell partition number can be assigned to the subject cell 180 ($C_{ij}$):

$$\text{Partition}(C_{ij}) = H(K_s \| H(P_{ij} \| k_s) \bmod m \quad (1)$$

Where: m is the number of partitions; H(x) is a hash function; $P_{ij}$ is a primary key for the cell $C_{ij}$; $k_s$ is the secret key 160 for the structured data 1000; and m is the number of partitions that the NC watermark ID code 100-1 has been divided into (e.g. the number of characters of NC watermark ID code 100-1 in the illustrated example).

In example embodiments, the primary key $P_{ij}$ for cell $C_{ij}$ is determined based on the content of cell $C_{ij}$. In the illustrated example, the cell primary key $P_{ij}$ is based on the first character of the data included in cell $C_{ij}$ and the length of cell $C_{ij}$. In a particular example, cell primary key $P_{ij}$ can be a concatenation of the first character of the data of cell $C_{ij}$ and the length "L" (e.g., number of characters) of the textual data of cell $C_{ij}$. For example, where the first character of data is a "T" and the length or the textual data contained in cell $C_{ij}$ is L=14, the primary key $P_{ij}$ can be the character string "T14". In some examples, the cell primary key $P_{ij}$ can be based on other properties and/or character locations of the data included in the cell, so long as the cell primary key $P_{ij}$ can be determined at a future watermark extraction time.

A concatenation of the cell primary key $P_{ij}$ and secret key $k_s$ are then provided to hash function H(x). The hash function $H(P_{ij} \| k_s)$ returns a first numerical hash value. The first numerical hash value returned by $H(P_{ij} \| k_s)$ is concatenated with the secret key 160 $k_s$ and provided to another instance of the hash function H(x) which returns a second hash number. A modulo operation is performed to return a cell partition number for the cell $C_{ij}$ (denoted "Partition ($C_{ij}$)") that is the remainder value (e.g., value between 0 and m−1) of the second hash value divided by the number of partitions (m). For example, if m=8, the partition number, or Partition($C_{ij}$) is a value between 0 and 7. As discussed above, the number of partitions m is the number of characters in the digital watermark (W).

The row-noise character embedding engine 102 selects the noise character at the partition location of NC watermark ID code 100-1 that corresponds to the cell partition number (Partition($C_{ij}$)) for embedding in content of cell $C_{ij}$. For example, FIG. 3 illustrates examples of cell partition numbers that have been determined in respect of 2 rows of tabular data 180. A representative cell $C_{ij}$ is labeled with "Partition0", indicating that cell $C_{ij}$ has been assigned cell partition number of 0. Accordingly, the first character of NC watermark ID code 100-1 (e.g., character "j" at partition location 0) will be selected for embedding in cell $C_{ij}$.

Referring again to FIG. 5, as indicated in block 356, the row-noise character embedding engine 102 determines an embedding position within the data included in cell $C_{ij}$ for the selected noise character (e.g., noise character "j" in the currently described example). Referring to FIG. 6, in example embodiments, the first and final characters (e.g. character locations 0 and L) of the original textual data 192 of cell $C_{ij}$ are reserved and not available for embedding of the noise character. In particular, as described above the first character at character location 0 (e.g., character "T" in the illustrated example) is used to determine the primary cell key $P_{ij}$, and thus needs to be preserved for future watermark extraction processing (described below). The final, $L^{th}$, character, is reserved for embedding of a character noise key selected from NKI 140, as described below.

The position at which the selected noise character is embedded in a cell $C_{ij}$ is determined based on the following equation:

$$\text{Embedding Position} = k_s \bmod (\text{Length of } C_{ij}) \quad \text{(II)}$$

Where $k_s$ is the secret key 160 described above. The embedding position is determined by applying a modulo operation to determine the remainder of the secret key $k_s$ divided by the length (e.g., number "L" of textual characters) of the data contained in cell $C_{ij}$. The resulting remainder value is a character position that is between 0 and (L-1).

As noted above, the first and final characters (e.g. character locations 0 and L) of the original textual data 192 of cell $C_{ij}$ are reserved and not available for embedding of the noise character. Accordingly, if the equation (II) returns an embedding position of 0, the embedding position used is position 1 (e.g., the location of the second character of the data contained in cell $C_{ij}$, and if the equation (II) returns an embedding position of L-1, the embedding position used is position L-2 (e.g., the penultimate character location in cell $C_{ij}$).

For illustrative purposes, in the example illustrated in FIG. 6, the embedding position returned by equation (II) is "3" (e.g., the $4^{th}$ character location in text data 192). At block 362, the noise character selected at block 354 (e.g. character "j" corresponding to Partition0 of NC watermark ID code 100-1) is used to replace the character that is located at the embedding position of the original data 192 contained in cell $C_{ij}$ (e.g., character "s").

At block 364, the last character of the data contained in cell $C_{ij}$ is replaced with a noise key character selected from the NKI 140. Similar to NC Watermark ID Code, the m character locations of NKI 140 are also divided into partitions 0 to m-1. The cell partition number determined for cell $C_{ij}$ in block 354 using equation (I) is used again to in block 364 to select the noise key character that is located at the partition location in NKI 140 that corresponds to the cell partition number determined for cell $C_{ij}$. In the illustrated embodiment, where the cell partition number is Partition0, the first noise key character "r" is selected from NKI 140, such that, as shown in FIG. 6, the final character "e" in original text data 192 is replaced in watermark embedded data 194 with noise key character "r" from NKI 140.

Although the first and last character locations of cell $C_{ij}$ have been reserved as non-embeddable positions in the presently described example, in other embodiments different locations could be reserved instead of or in addition to such locations.

Referring again to FIG. 4, the noise character embedding process 350 is repeated for all cells 186 for each of the rows 182 that have been selected for NC watermarking. As can be seen by the illustrative cell partition numbers indicated in FIG. 3, different characters from the NC watermark ID code 100-1 will be embedded in different cells of each of the watermark embedded rows in an order that is a function of the actual content of the respective cells 186 and the secret key 160 (Ks).

Invisible Character Embedding

Figure 7:
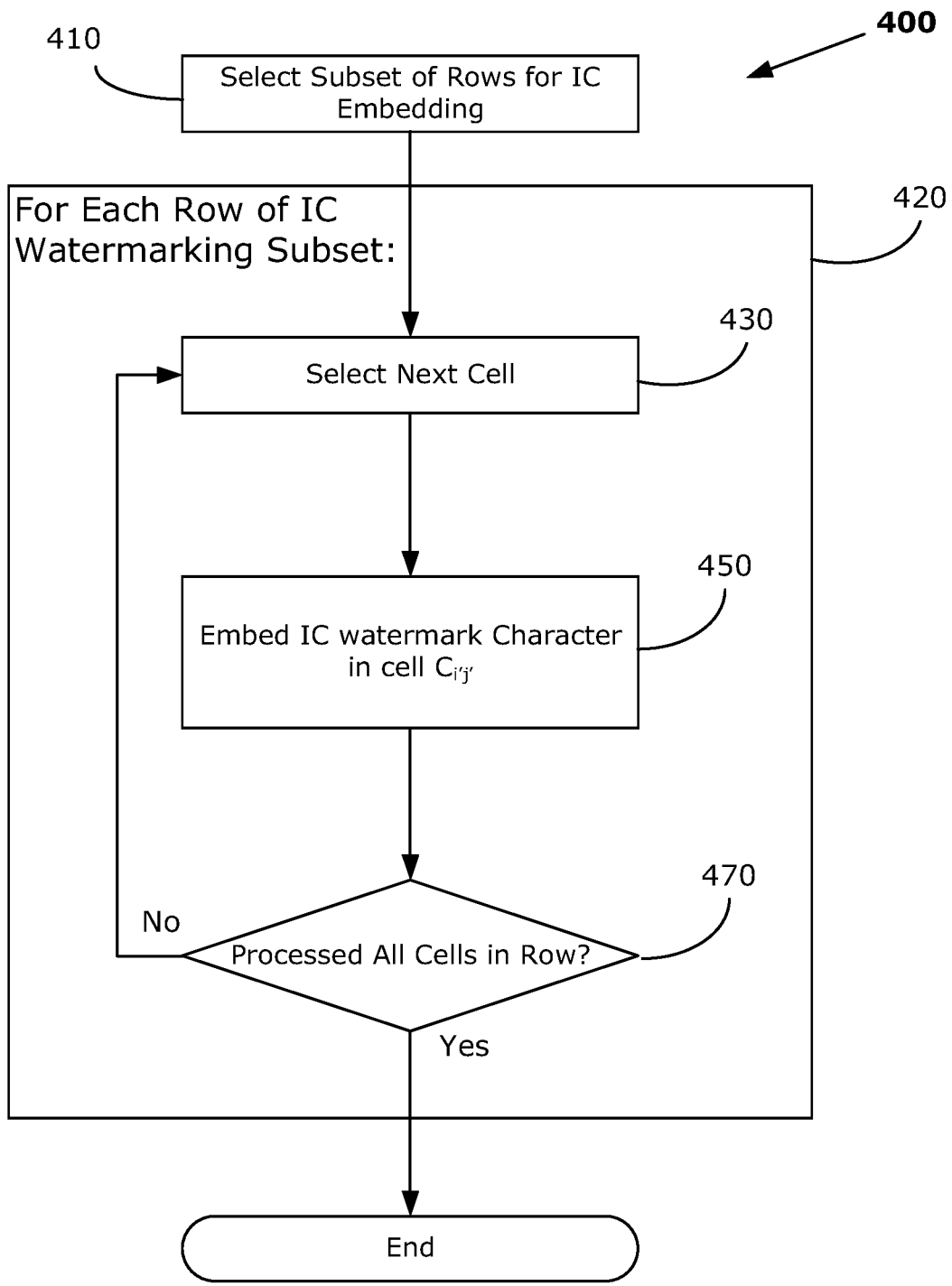
FIG. 7 is a flow chart depicting the steps for embedding invisible watermark characters into structured textual data, in accordance with example embodiments.

Referring to FIGS. 2 and 7, invisible character embedding engine 104 is configured to embed invisible characters from IC watermark ID code 120-1 into selected rows of data table 180 of structured textual data 1000-1 by applying sub process 400 as follows.

Similar to the embedding process 300 performed by row-noise embedding engine 102, invisible character embedding engine 104 is also configured to select a subset of rows 182 located throughout table 180 for IC watermarking (Block 410 in FIG. 7). The subset of rows for IC watermarking can be selected in a similar manner as the subset for row-noise watermarking described above in respect of block 310. In at least some example embodiments where both row-noise embedding and invisible character embedding are performed, watermark embedding system 90 is configured to select different rows 182 of tabular data 180 for invisible character embedding than those that are used for row-noise embedding. In example embodiments, the relative number of rows 182 included in the IC watermarking subset is predefined and may be a configurable parameter (e.g., 5% in some examples, up to 20% in other examples). In some examples, the number or rows subjected to invisible character embedding and row-noise embedding may be a combined total of 5% (e.g., 2.5% of rows embedded using invisible character embedding and 2.5% of rows embedded using row-noise embedding.)

As indicated in FIG. 7, once the IC watermarking row subset is selected, each row of the subset is then subjected to IC embedding process 420. Referring to blocks 430, 450 and 470, during IC embedding process 420, all of the cells 186 in the subject row are each embedded with an invisible character selected from the IC watermark ID code 120-1.

Figure 8:
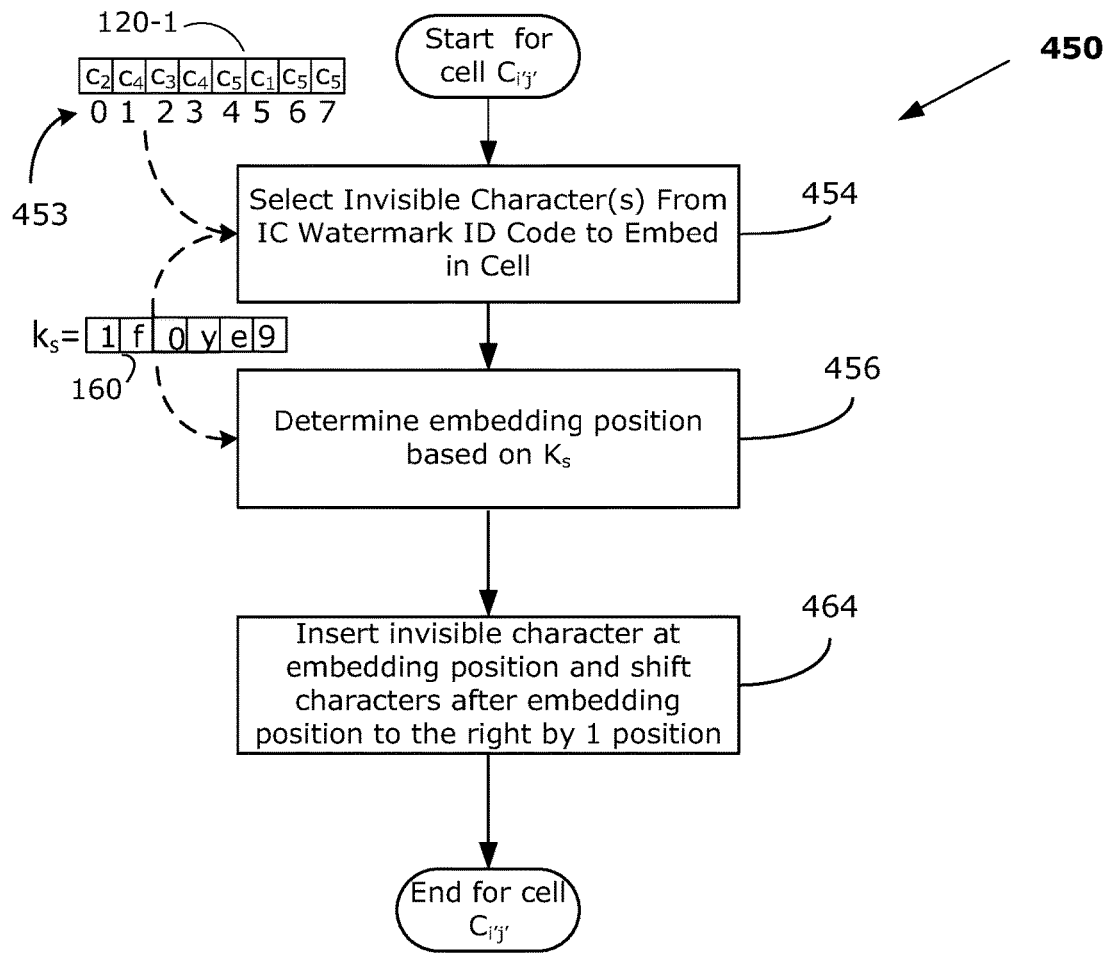
FIG. 8 is a flow chart depicting the steps for embedding an invisible watermark character into a single cell of the structured textual data, in accordance with example embodiments.
Figure 9:
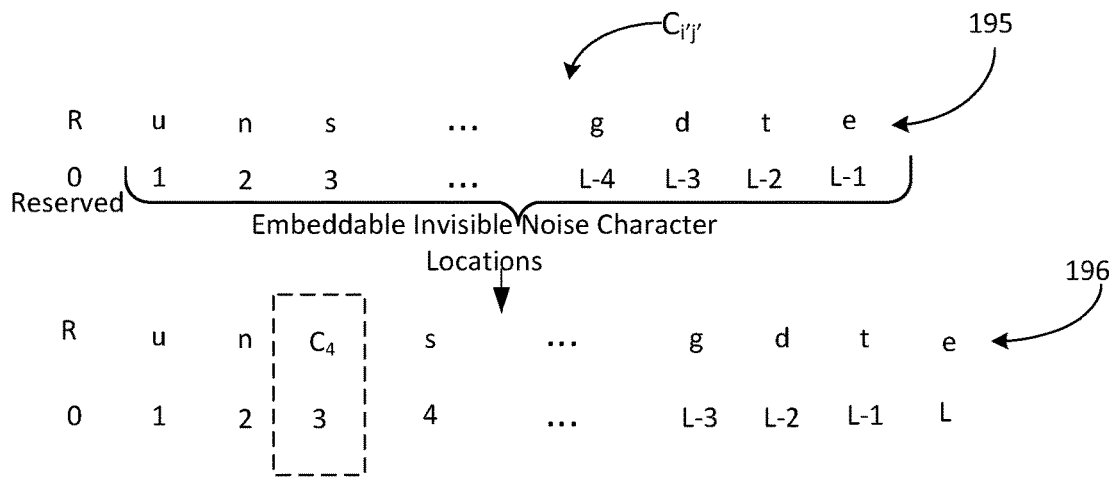
FIG. 9 is an example of textual data included in a tubular data cell before and after invisible character embedding.

An illustrative example of sub-process 450 for embedding an invisible character into a specific cell 186 is shown in greater detail in FIG. 8. Representative cell $C_{i'j'}$ is used for an explanation of IC watermarking. For illustrative purposes, FIG. 9 shows the possible sample of textual data 192 contained in cell $C_{i'j'}$ of tabular data 180, along with the corresponding textual data 196 contained in the same cell $C_{i'j'}$ after invisible character embedding sub-process 450. As illustrated in FIG. 9, in the resulting invisible character textual data 196, the invisible character "$c_4$" has been inserted into an embedding position (e.g. embedding position 3, corresponding to the $4^{th}$ character location) that corresponds to the position of the character "s" in the original textual data 192. Furthermore, unlike the noise character embedding process 350 described above, the "s" character is not overwritten; rather in at least some example embodiments, the selected invisible character is inserted at the determined embedding location and all of the remaining original text data characters from the embedding location onwards are pushed to the next character location, and the length of the resulting text data 196 included in cell $C_{ij}$ is increased by an extra character (e.g., L'=L+1 characters, where L' is the length of the post-embedding data 196). In example embodiments, sub-process 450 generates invisible character-embedded textual data 196 as follows.

In example embodiments, the character locations of IC watermark ID code 120-1 are partitioned and assigned respective partition numbers in a manner identical to that described above in respect of NC watermark ID code 100-1. In particular, each character location of IC watermark ID code 120-1 is assigned a respective partition number 453, with the first invisible character location (e.g., location of invisible text character "$c_2$") in IC watermark ID code 120 being assigned a partition number equal to 0 (Partion0), the second invisible character location (e.g., location of first occurrence of invisible character "$c_4$") is assigned a partition number equal to 1 (Partion1), and so on, with the $m^{th}$ invisible character location (e.g., location of final invisible character "$c_5$") being assigned a partition number equal to m−1 (e.g., Partition7 in the illustrated case where m=8).

As indicated in block 454, the invisible character embedding engine 104 selects content from the IC watermark ID code 120-1 to embed. In example embodiments, this selection is done in the same manner as described above in respect of row-noise embedding. Namely, a cell partition number is assigned to the subject cell 180 ($C_{ij'}$) based on the data content of the cell using the above equation (I). The invisible character embedding engine 104 selects the invisible character at the partition location of IC watermark ID code 120-1 that corresponds to the cell partition number (Partition($C_{ij'}$)) for embedding in content of cell $C_{ij'}$. For the present illustrative example, let the partition number assigned to cell $C_{ij'}$ be "partition3". Accordingly, the fourth character of IC watermark ID code 1200-1 (e.g., character "$c_4$" at partition1) will be selected for embedding in cell $C_{ij'}$.

As indicated in block 456, the invisible character embedding engine 104 determines an embedding position within the data included in cell $C_{ij'}$ for the selected invisible character (e.g., invisible character "$c_4$" in the currently described example). In example embodiments, the embedding position can be determined in the same manner as described above (block 356, FIG. 5) for noise character embedding, subject to the following difference. As invisible characters will typically be easily discernable in electronic form from the rest of the textual data there is no need to embed the equivalent of a noise character key in cell $C_{ij'}$ to flag the cell as containing an invisible character. Accordingly, although the first character location (position 0) of the text data 195 is reserved to allow the cell primary key to be recovered, there is no need to reserve the final character location (position L−1). Accordingly, the position at which the selected invisible character is embedded in cell $C_{ij'}$ is determined based on the equation (II) noted above, resulting in a character position that is between 0 and (L−1). If the equation (II) returns an embedding position of 0, the embedding position will be increased by one to position 1, otherwise the embedding position will be applied as is.

For illustrative purposes, in the example illustrated in FIG. 9, the embedding position returned by equation (II) is "3" (e.g., the $4^{th}$ character location in text data 195). At block 464, the invisible character selected at block 454 (e.g., invisible character "$c_4$" corresponding to Partition1 of IC watermark ID code 120-1) is inserted at the embedding position of the original data 192 of cell $C_{ij'}$ (e.g., character "s" at embedding position 3). As noted above, none of the characters of original data 195 are overwritten; rather all of the original characters are shifted over by a character space in embedded data 196. The display screen rendered or printed length of the embedded data 196 of embedded cell $C_{ij'}$ will remain the same as that of data 195 as the invisible character "$c_4$" has a zero-width when displayed.

Referring again to FIG. 7, the invisible noise character embedding process 450 is repeated for all cells 186 for each of the rows 182 that have been selected for IC watermarking.

Column Noise Embedding

Figure 10:
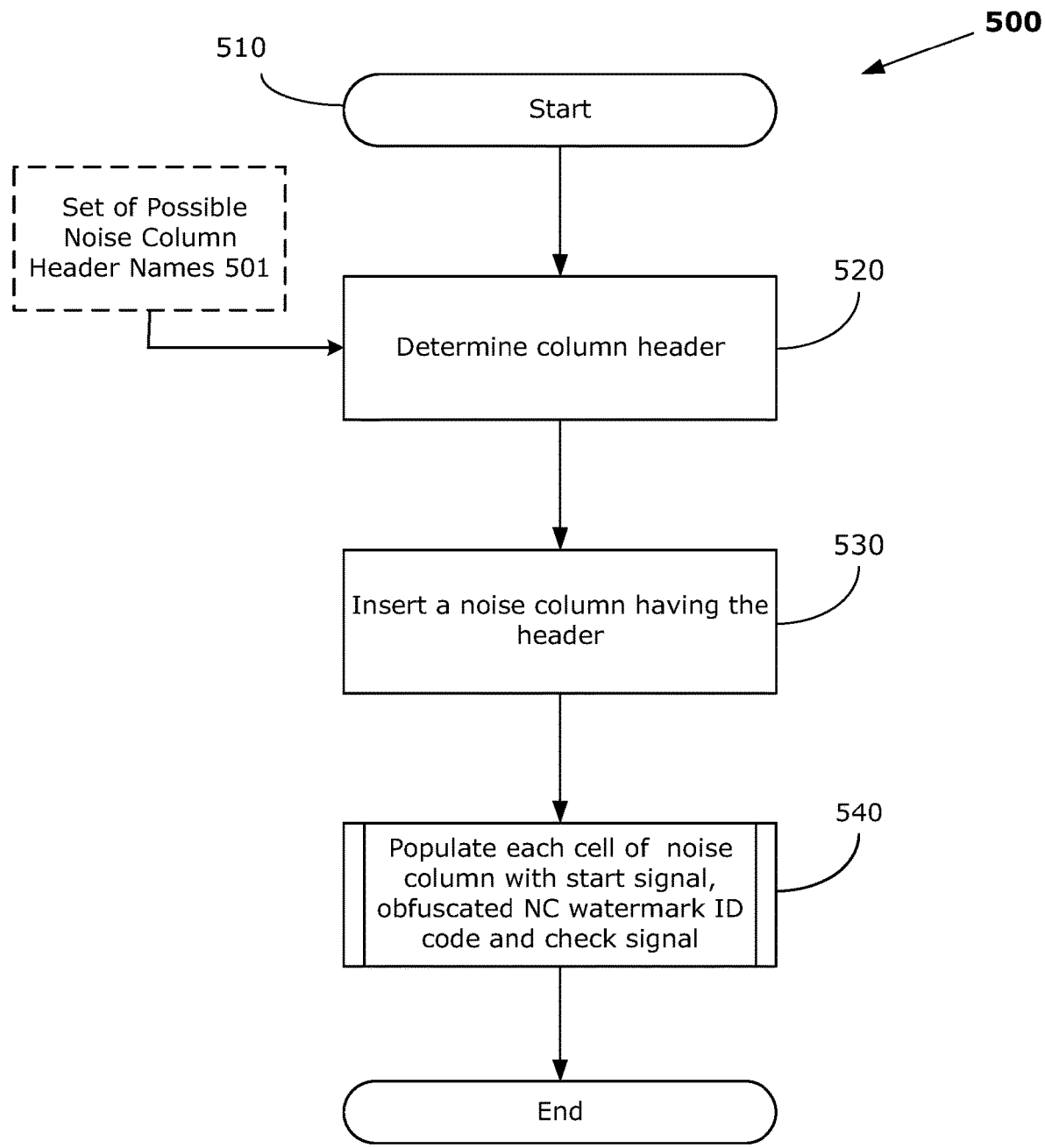
FIG. 10 is a flow chart depicting the steps for embedding column-noise watermarking into structured textual data, in accordance with example embodiments.

Referring to FIGS. 2 and 10, column noise embedding engine 106 is configured to embed a column into data table 180 of structured textual data 1000-1 by applying sub process 500 as follows:

Column-noise character embedding involves inserting an extra column into the tabular data 180. The extra column comprises a column of cells that each store watermarking information that can appear as noise to an observer. In an example embodiment, the "noise column" is given a header name (e.g., field label) selected from a set of predefined header names 501. In example embodiments, the set of predefined header names 501 is stores as part of watermark database 92. In another embodiment, the noise column is given a header name based or modeled on the header names of existing columns in the table, such that the noise column is difficult for an attacker to identify and delete. FIG. 10 depicts a process 500 for column-noise character embedding. The process starts at block 510. In the illustrated embodiment, a column header is selected from the set of pre-defined header names 501 (Block 520). At 530, a noise column is inserted into the table 180. In example embodiments, the location of the noise column is randomly selected and the original column 184 at the insertion point, and all columns 184 to the right of the insertion location, are shifted right by a column. The noise column is then populated (Block 540) such that each cell of the noise column is populated with a encoded noise column data string.

Figure 11:
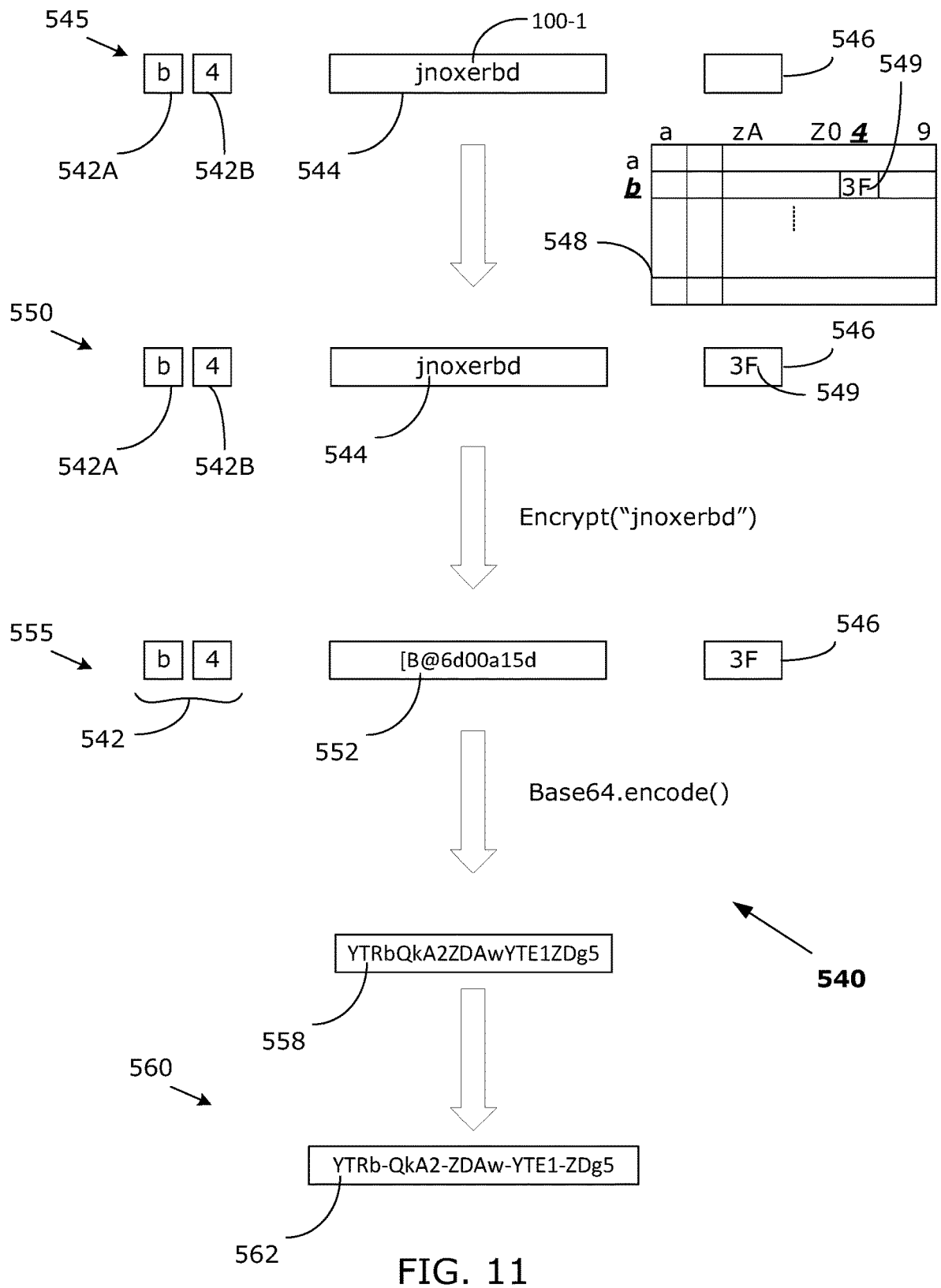
FIG. 11 is a flow diagram depicting the steps of preparing column noise for embedding into a cell of a noise column, in accordance with example embodiments.

FIG. 11 depicts a sub-process of 540 by which a cell $C_N$ (where $C_N$ denotes a representative cell within the noise column) of the noise column is populated with a noise column data string 562 that comprises an encoded concatenation of a start signal 542, an obfuscated version 552 of noise character watermark ID code 100-1, and a check signal 546. Initially, at step 545, a start signal 542 is randomly selected. In the depicted example, the start signal 542 is comprised of two alphanumeric characters 542A and 542B. In the illustrated example, each of the characters 542A and 542B is randomly selected from the English language set of uppercase letters, lowercase letters, and numbers. Accordingly, each of the characters 542A and 542B can have 62 possible values, because there 26 uppercase letters, 26 lowercase letters and 10 numbers (0-9). Following the start signal 542, a watermark field 544 is initially populated with the digital noise character watermark ID code 100-1. Check signal 546 follows the watermark field 544. The check signal 546 is selected from pre-populated CN map book 548. The CN map book 548 is a 2-dimensional array that, in the illustrated embodiment, is indexed by the alphanumeric characters 542A and 542B of the start signal 542. In the depicted embodiment, the map is a 62 by 62 2-dimensional array. The first character 542A of the start signal 542 maps to rows of the map book. The second character 542B of the start signal 542 maps to columns of the map book. The check signal 546 is populated with the value at the intersection of the row and column of the map book 548 mapped by the values of the characters 542A and 542B, respectively. In the depicted embodiment, the row specified by the first character 'b', and the column specified by the second character '4' both intersect at the value 549 of the map book 548, mapping to a value of "3F" for check signal 546.

At step 550, the NC watermark ID code 100-1 contained in watermark field 544 is passed to an encryption function, while the start signal 542 and the check signal 546 are left unchanged. The encryption function generates an encrypted watermark value 552 from the NC watermark ID code 100-1. At step 555, the start signal 542, the encrypted watermark value 552, and the check signal 546 are concatenated and the resulting string is encoded using a Base64 encoder. The resulting obfuscated value 558 is stored in the cell $C_N$. Finally at step 560, in some examples some decoration characters may be added based on predetermined modification rules to the obfuscated value 558. For example, the obfuscated watermark may be split up by inserting dashes every few characters, to produce a decorated obfuscated value 562. In example embodiments, the set of decoration characters and associated modification rules are also stored in the watermark database 92.

Watermarked Data Version

The respective sub-processes described above in respect of row-noise character embedding engine 102, invisible character embedding engine 104 and column noise embedding engine 106 on structured textual data 1000 generate watermarked digital data version 2000-1 that includes embedded digital watermark information 108-1. In the described embodiment, digital watermark information 108-1 includes three types of digital watermarks, namely: row-noise watermarking applied to a first set of scattered rows 182 of tabular data 180; invisible character watermarking applied to a second set of scattered rows 182 of tabular data 180; and column-noise watermarking applied to a column of the tabular data. In example embodiments, all three of these types of digital watermarks independently embed information that maps to authorized recipient identifier 98-1. In some examples the order of applying the three different types of digital watermarks can be varied from that described above. Furthermore, one or two of the digital watermark types may be omitted in some example applications Extraction System and Process If a watermarked data version is illegally copied (in whole or part) or leaked, an extraction process can be carried out on the copied or leaked data to extract one or both of the NC watermark ID code and/or IC watermark ID code, which will map to a specific authorized recipient of watermarked data version 2000-z (where 1<=z<=M).

Figure 12:
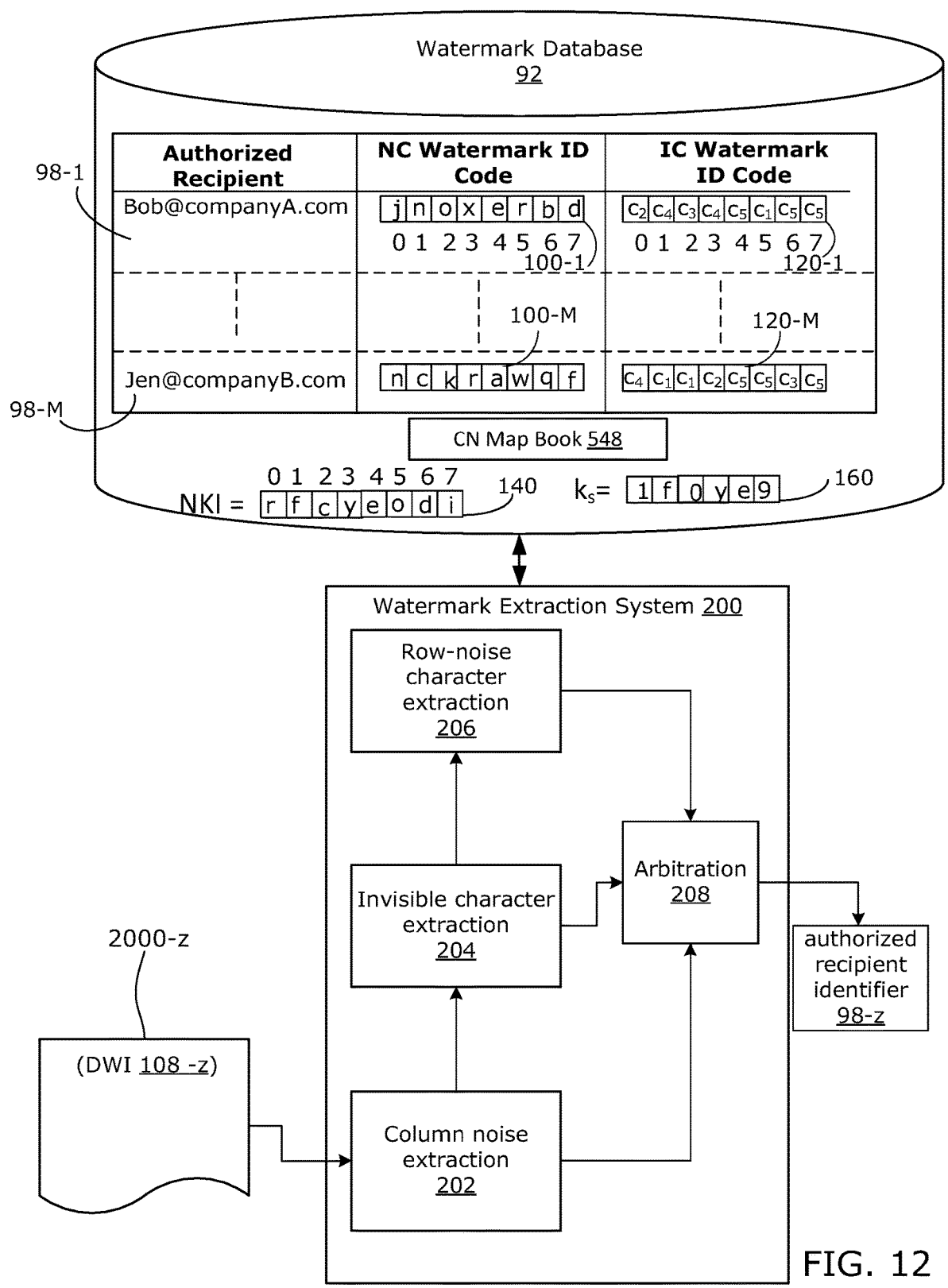
FIG. 12 is a block diagram illustrating a digital watermarking extraction system, in accordance with example embodiments.

By way of example, FIG. 12 depicts an example of a digital watermark extraction system 200 that may be implemented by the same digital processing system 3000 that implements watermark embedding system 90, or by a different digital processing system 3000. Digital watermark extraction system 200 is configured to receive, as input, watermarked data version 2000-z that embeds digital watermark information 108-z, and to output a respective authorized recipient identifier 98-z. Digital watermark extraction system 200 includes: a column-noise extraction engine 202 for performing a column-noise extraction process 650; an invisible character extraction engine 204 for performing an invisible character extraction sub-process 700; a row-noise character extraction engine 102 for performing a row-noise character extraction sub-process 800; and an arbitration engine 208 for arbitrating between outputs generated by the respective extraction engines 202, 204, 206. In some examples, some of the engines 202, 204, 206 and 208 may be omitted or placed in a different order than shown. Digital watermark extraction system 200 also includes or has access to watermark database 92, however digital watermark extraction system 200 does not require access to the original structured textual data 1000.

Column Noise Extraction

Figure 13:
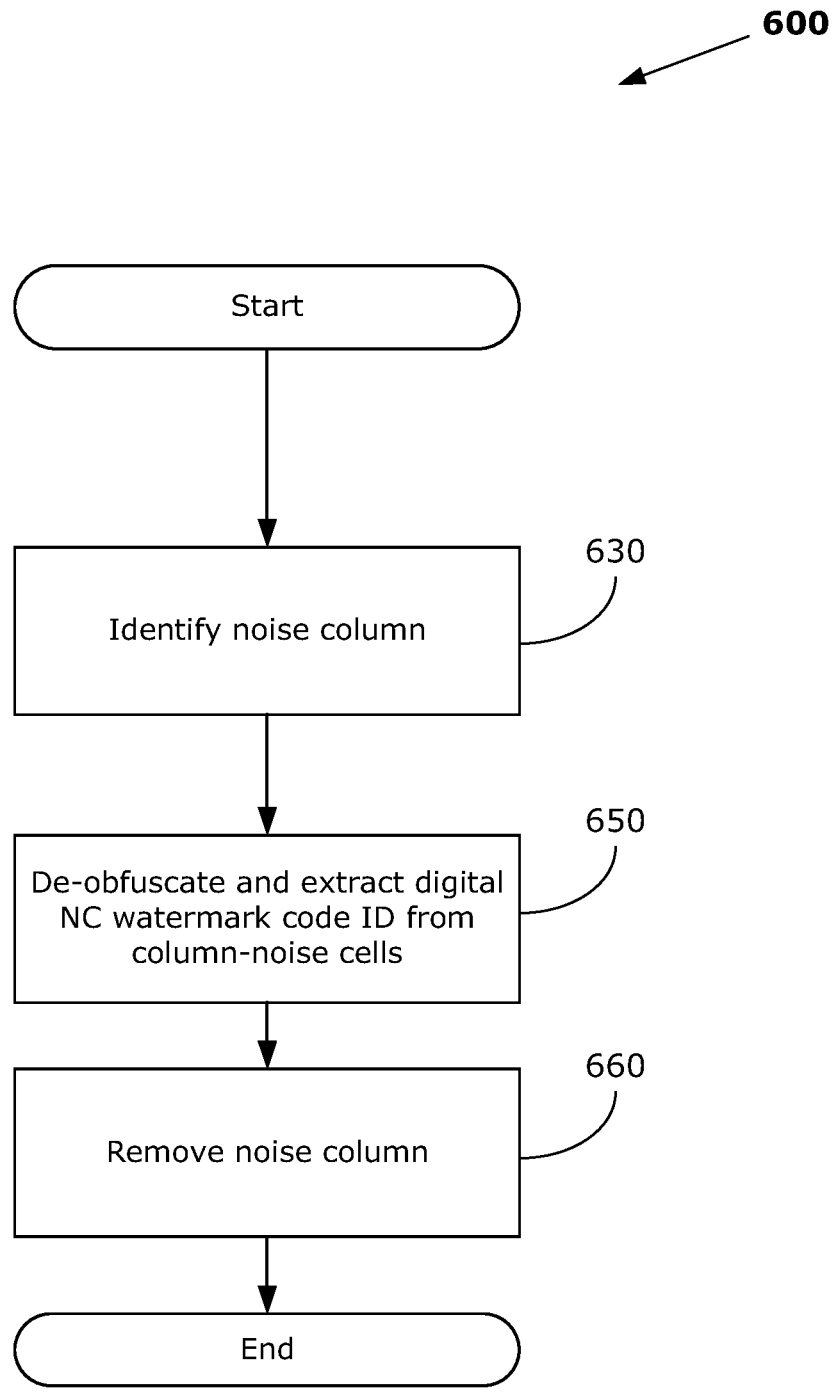
FIG. 13 is a flow chart depicting the extracting a digital watermark from a noise column, in accordance with example embodiments.

As indicated in FIG. 13, the watermarked data version 2000 is first subjected to a column-noise extraction sub-process 600, applied by column noise extraction engine 202, to recover digital CN watermark code ID 100-z from the noise column. The input to the column-noise sub-process 600 includes the tabular data 180 included in watermarked data version 2000-z, the noise column header names set 501 from which the noise column header name was selected, and the CN map book 548 which was used by the sub-process 500 to derive the stop signal 546 from the start signal 545.

As indicated at Block 630 the noise column is identified. In the illustrated example, the column header name of each of the columns 184 of tabular data 180 included in the watermarked data version 2000 is compared with the column header names in the set of noise column header names set 501 to identify a match and thereby identify the noise column. Next, a sub-process 650 is executed on the cells $C_N$ of the noise column to de-obfuscate and extract the digital CN watermark ID code 100-z from the cells $C_N$ of the identified noise column. The steps of sub-process 650 are described in detail with reference to FIG. 14.

Figure 14:
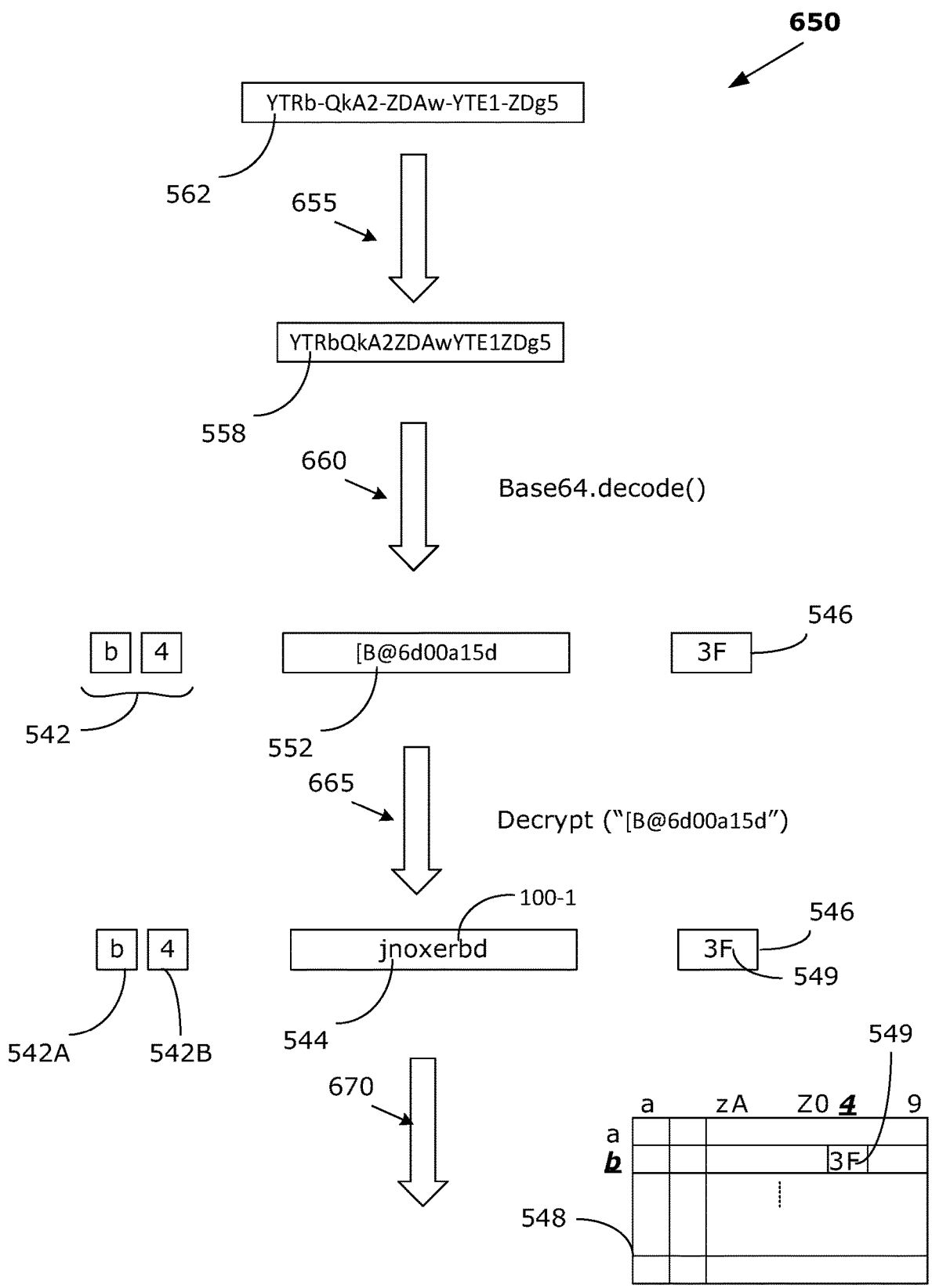
FIG. 14 is a flow diagram depicting the steps for extracting a digital watermark from column-noise embedded in a single cell of a noise column, in accordance with example embodiments.

FIG. 14 depicts a sub-process 650 for extracting the CN watermark ID Code. Step 655 removes the decoration characters, such as the dashes, from the contents 562 of a noise column cell. At step 660, the undecorated contents 558 of the noise column cell are decoded using the same Base64 method used to encrypt them at the embedding sub-process 500. The decoded contents of the cell are now comprised of three components: a start signal 542, an encrypted watermark value 552, and a check signal 546. At step 665, the encrypted watermark value 552 is decrypted to return a value in watermark field 544, which should be equal to the digital NC watermark ID code 100-z used at the column noise embedding sub-process 500 by the watermark embedding system 90. To verify that the contents in the noise column have not been tampered with by an attacker, step 670 validates the data by verifying the relationship between the start signal 542 and the check signal 546. This is achieved by indexing with the first start byte 542A into the rows of the map book 548 and indexing with the second byte 542B into the columns of the map book 548. The value 549 at the intersection of the row and the column is compared with the check signal 546. If the value 549 returned from the map book matches the value of the check signal 546, then there is a high probability that the value in watermark field 544 is the NC watermark ID code 100-z used in the column noise embedding sub-process 500. Another way to verify that the digital watermark 544 has not been altered is to repeat the extraction process 600 with other cells in the noise column. Because the same NC watermark ID code 100-z, subjected to different start and check signals, is encoded and decorated multiple times in the noise column it would be very difficult for an attacker falsify multiple obfuscated versions of the watermark ID code 100-z consistently through all cells in the noise column.

As indicated in block 660 of FIG. 13, in example embodiments, once the watermark ID code 100-z is extracted, the noise column is then removed from the tabular data 180 and all of the original columns 184 that were right-shifted to accommodate insertion of the noise column are left shifted back to their respective original positions. In at least some example embodiments this is done so that the noise column does not appear in the tabular data 180 during IC character extraction and row noise extraction.

Invisible Character Extraction

Figure 15:
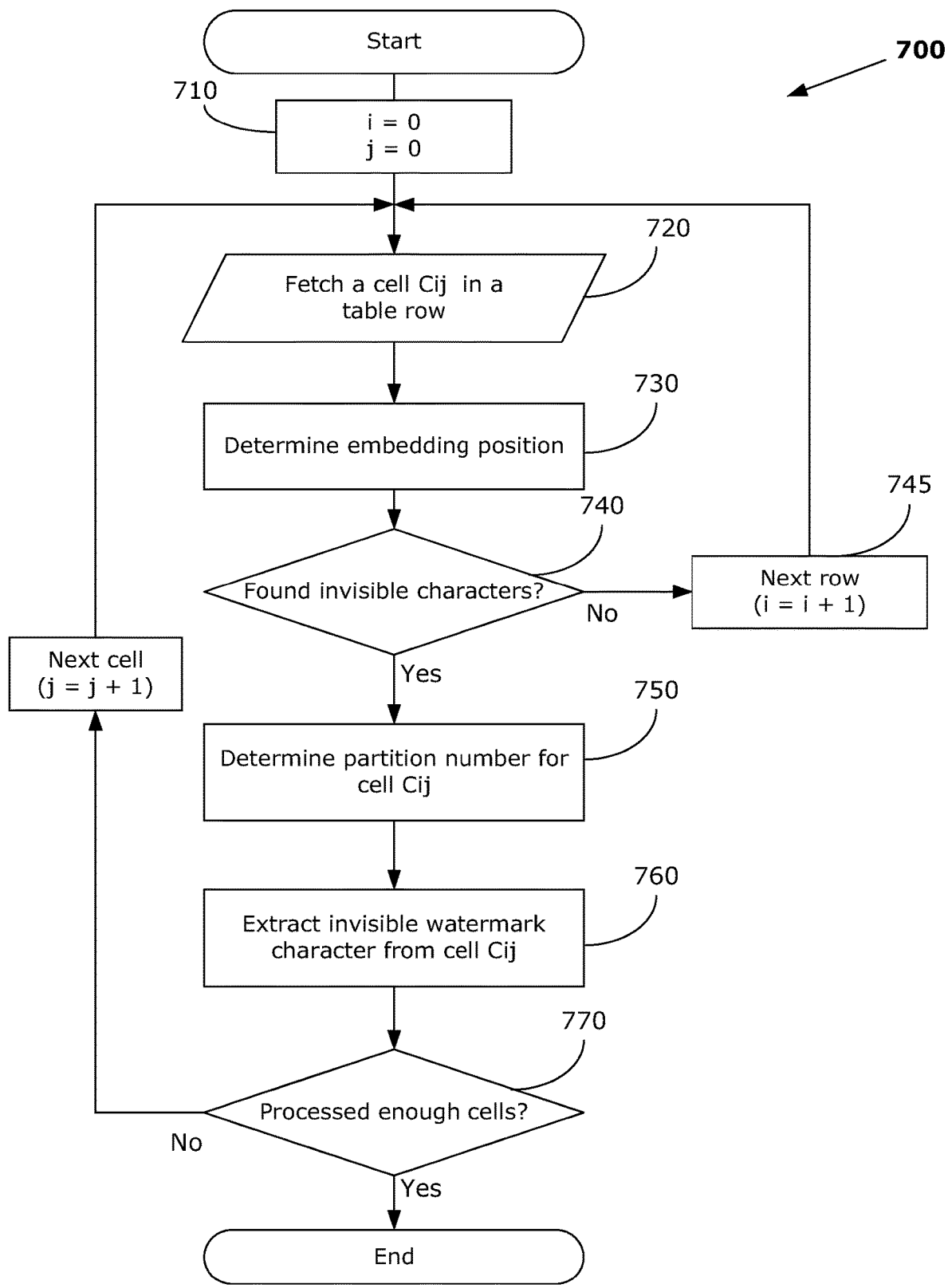
FIG. 15 is a flow chart depicting the steps for extracting a digital watermark from invisible characters embedded in the structured textual data, in accordance with example embodiments.

Character extraction sub-process 700 (shown in FIG. 15) is performed by invisible character extraction engine 204 to recover digital IC watermark code ID 120-z. The input to the sub-process 700 includes the watermarked data version 2000-z (after column-noise extraction if applicable) and the secret key $k_s$ 160 which is necessary to determine the partition assignments for the cells 186 in the table 180 of watermarked data version 2000-z.

In the illustrated embodiment, in the invisible character embedding sub-process 400 the invisible characters were embedded in the table 180 in a row-wise manner. Accordingly, if a particular row 182 of the table 180 has any invisible characters embedded therein, then all cells in that row will also have invisible characters embedded therein. Therefore, in the illustrated example, sub-process 700 starts at the first row 182 and first column 184 of the table 180. If that cell has an invisible character at the expected embedding positon, then the invisible watermark character corresponding to the partition number of that cell is extracted. Furthermore, other cells in the same row 182 are also checked for an invisible watermark character at their respective embedding positions. In some examples, once enough cells are processed for an IC watermark ID code to be extracted, the sub-process ends.

At step 710 the row and column index values i and j are initialized to point to the first cell in the first row (0, 0). At step 710, the cell 186 ($C_{ij}$) is fetched. At step 730, the embedding position for the fetched cell 186 is determined. The embedding position is determined based on a secret key 160 ($k_s$) and the length of the cell $C_{ij}$ as per equation (II). In computing the embedding position, the length of the cell $C_{ij}$ is decremented by 1 to obtain the original length before the invisible watermark character was inserted. At step 740 the character at the embedding position of the fetched cell 186 ($C_{ij}$) is checked against the invisible character set $\{c_1, c_2, c_3, c_4, c_5\}$. If the character at the embedding position is does not match an invisible character from the invisible character set $\{c_1, c_2, c_3, c_4, c_5\}$, then at 745 the row index (i) is incremented and a new cell from the next row is fetched at 720. If, at step 740, an invisible character is detected at the embedding position, then at step 750 the partition number of the cell $C_{ij}$ is computed. The partition number is dependent on the secret key $k_s$, the first character of the cell $C_{ij}$ and the length of $C_{ij}$. Again, the length needs to be decremented by 1 to obtain the original length used to compute the partition number at the invisible character embedding sub-process 400. Once the partition number is computed, then at step 760, the invisible character found in cell $C_{ij}$ at the embedding position represents the portion of the IC watermark ID code 120-z corresponding to the partition number. At step 770, the system checks whether enough cells have been processed to determine the entire invisible IC watermark ID code 120—with a threshold level of certainty (e.g., each partition no. has been recovered with the same character value 2 times). If so, the sub-process 700 ends at step 780. If not, then at 775, the column index is incremented and the steps 720 to 770 are repeated. In one embodiment, the sub-process 700 stops when each of the partitions of the IC watermark ID code 120-z have been extracted a number of times with a consistent value. In another embodiment, the sub-process continues until a predetermined percentage of the data has been processed. For example, if 5% of the rows in the table have been embedded with invisible characters, the sub-process 700 may continue until all 5% of the rows containing embedded cells have been processed.

Row-Noise Extraction

Figure 16:
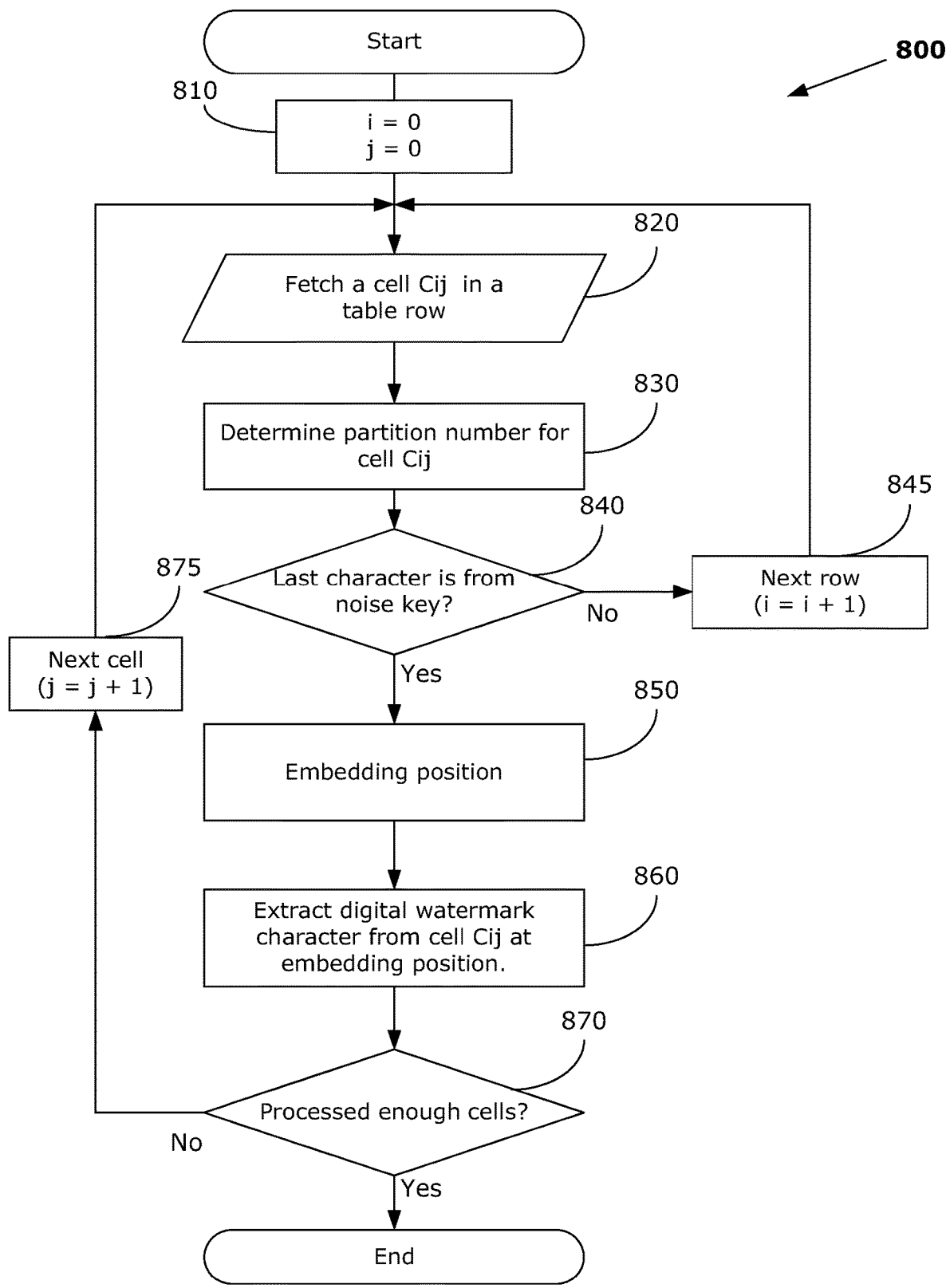
FIG. 16 is a flow chart depicting the steps for extracting a digital watermark from row-noise characters embedded in the structured textual data, in accordance with example embodiments of the present disclosure.
Figure 17:
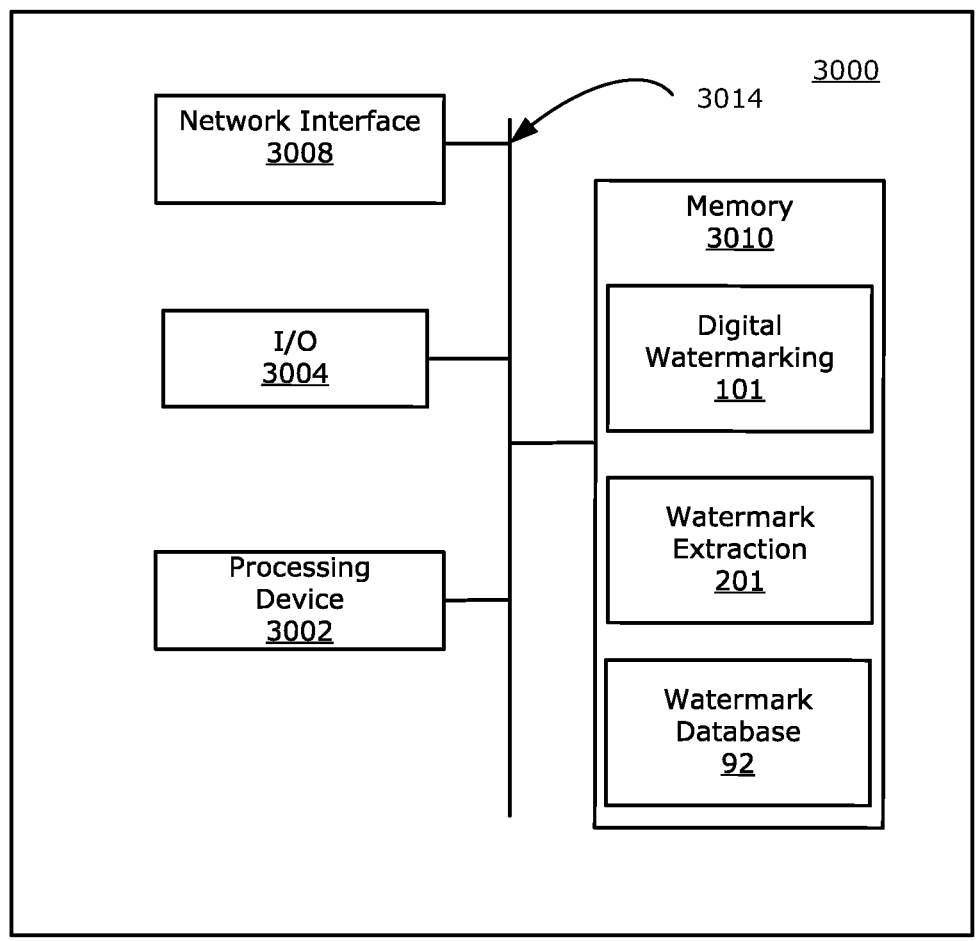
FIG. 17 is a block diagram illustrating a processing system which may be used for carrying out the methods described herein.

Referring to FIG. 16, watermarked data version 2000-z is then subjected to row-noise character extraction sub-process 800 by row-noise character extraction engine 206 to extract the partitions of NC watermark ID code 100-z embedded as portions in individual cells. The inputs to the sub-process 800 include: the watermarked data version 2000-z (after column-noise extraction 600 and invisible character extraction 700, whichever is applicable), the secret key 160 $k_s$, and the noise key index (NKI) 140 which were used at the corresponding embedding sub-process 300.

At step 810, a row index (i) and a column index (j) are initialized to point to the first cell in the first row in tabular data 180 containing structured textual data. The cell $C_{ij}$ is fetched at step 820. At step 830, the partition number for the cell $C_{ij}$ is determined as explained above using equation (I) based on the secret key 160 ($k_s$) which is provided as input to the sub-process 800, the first character of the cell $C_{ij}$ and the length of the cell $C_{ij}$. To determine whether the cell $C_{ij}$ contains a portion of the digital watermark 100 (W), at 840 the last character of the cell $C_{ij}$ is checked against the noise key 140 (F) character corresponding to the partition number. If the last character of $C_{ij}$ corresponds to the corresponding noise key character in the NKI 140 (as determined by partition Number), then the cell $C_{ij}$ contains a portion (or character) of the digital NC watermark ID code 100-z. If not, then the entire row specified by row index (i) does not contain row-noise characters embedded therein. In this case, at step 845, the row index (i) is incremented and control returns back to step 820 to fetch a cell from the next row 182 in the table 180. At step 850, the embedding position is determined based on the length of $C_{ij}$ and the secret key 160 ($K_s$) provided as input to the sub-process 800, as per equation (II). At 860, the character at the embedding position is extracted as the digital watermark character corresponding to the partition number 190 of cell $C_{ij}$. At step 870, a determination is made whether enough cells have been processed to determine the NC watermark ID code 100-z with enough certainty. For example, while it is enough to extract watermarking characters from cells with enough unique partition numbers 190 to cover all of the portions of the digital watermark 100 (W), the sub-process may continue processing more cells until each partition of NC watermark ID code 100-z has been verified a number of times to ensure that the structured textual data 2000 was not tampered with. Accordingly, at step 870 if more cells need to be processed, the column indicator is incremented to process the next cell $C_{ij}$ in the current row. Once a particular row is processed, the sub-process 800 increments the row index (j) to process the next row. The decision as to whether or not to process more cells may also depend on the percentage of cells processed compared to the percentage of cells expected to contain watermarking characters embedded therein.

Arbitration Engine

The recovered DWI 108-Z includes: IC watermark ID code 120-z provided by character extraction sub-process 700; a first NC watermark ID code 100-z provided by the column noise extraction sub-process 600; and a second NC watermark ID code 100-z provided by the row-noise extraction sub-process 800. Although the first and second NC watermark ID codes 100-z should be identical, and all of the recovered watermark ID codes 100-z, 120-z should all map back to the same authorized recipient identifier 98-z, it is possible that data corruption (either unintentional or by means of an attack) may have occurred that provide a mismatch. Accordingly, in example embodiments, arbitration engine 208 is configured to match each of these three recovered ID codes back to an authorized recipient identifier 98-z. If the watermarked data version 2000 is uncorrupted, all three recovered ID codes should map to the same authorized recipient identifier 98-z, and the corresponding identifier output as the source of the analyzed watermarked data version 2000-z. In example embodiments, in the event that the three recovered ID codes do not all map back to the same authorized recipient identifier 98-z, then a majority vote (e.g. 2 of 3) is used to determine the authorized recipient identifier.

FIG. 16 illustrates an example processing system 3000, which may be used to implement methods and systems described herein, such as the digital watermark embedding system 100 process or the watermark extraction system 200. Other processing systems suitable for implementing the methods and systems described in the present disclosure may be used, which may include components different from those discussed below. Although FIG. 16 shows a single instance of each component, there may be multiple instances of each component in the processing system 3000.

The processing system 3000 may include one or more processing devices 3002, such as a processor, a microprocessor, an application-specific integrated circuit (ASIC), a field-programmable gate array (FPGA), a dedicated logic circuitry, or combinations thereof. The processing system 3000 may also include one or more input/output (I/O) interfaces 3004, which may enable interfacing with one or more appropriate input devices and/or output devices (not shown).

The processing system 3000 may also include one or more storage units 3013, which may include a mass storage unit such as a solid state drive, a hard disk drive, a magnetic disk drive and/or an optical disk drive. The processing system 3000 may include one or more storage or memory units 3010, which may include a volatile memory (e.g., a random access memory (RAM)) or non-volatile memory or storage (e.g., a flash memory, read-only memory (ROM), mass storage unit such as a solid state drive, a hard disk drive, a magnetic disk drive and/or an optical disk drive). The non-transitory memory(ies) may store instructions for execution by the processing device(s) 3002, such as to carry out the methods and systems of the present disclosure. Such instructions may include instructions 101 that configure processing device 3002 and processing system 3000 to implement watermark embedding system 100, and instructions 201 that configure processing device 3002 and processing system 3000 to implement watermark extraction system 201. The non-transitory memory(ies) may store watermark database 92. The memory(ies) may include other software instructions, such as for implementing an operating system and other applications/functions. In some examples, one or more data sets and/or module(s) may be provided by an external memory (e.g., an external drive in wired or wireless communication with the processing system 3000) or may be provided by a transitory or non-transitory computer-readable medium.

There may be a bus 3014 providing communication among components of the processing system 3000, including the processing device(s) 3002, I/O interface(s) 3004, network interface(s) 3008, memory(ies) 3010. The bus 3014 may be any suitable bus architecture including, for example, a memory bus, a peripheral bus or a video bus.

Figure 18:
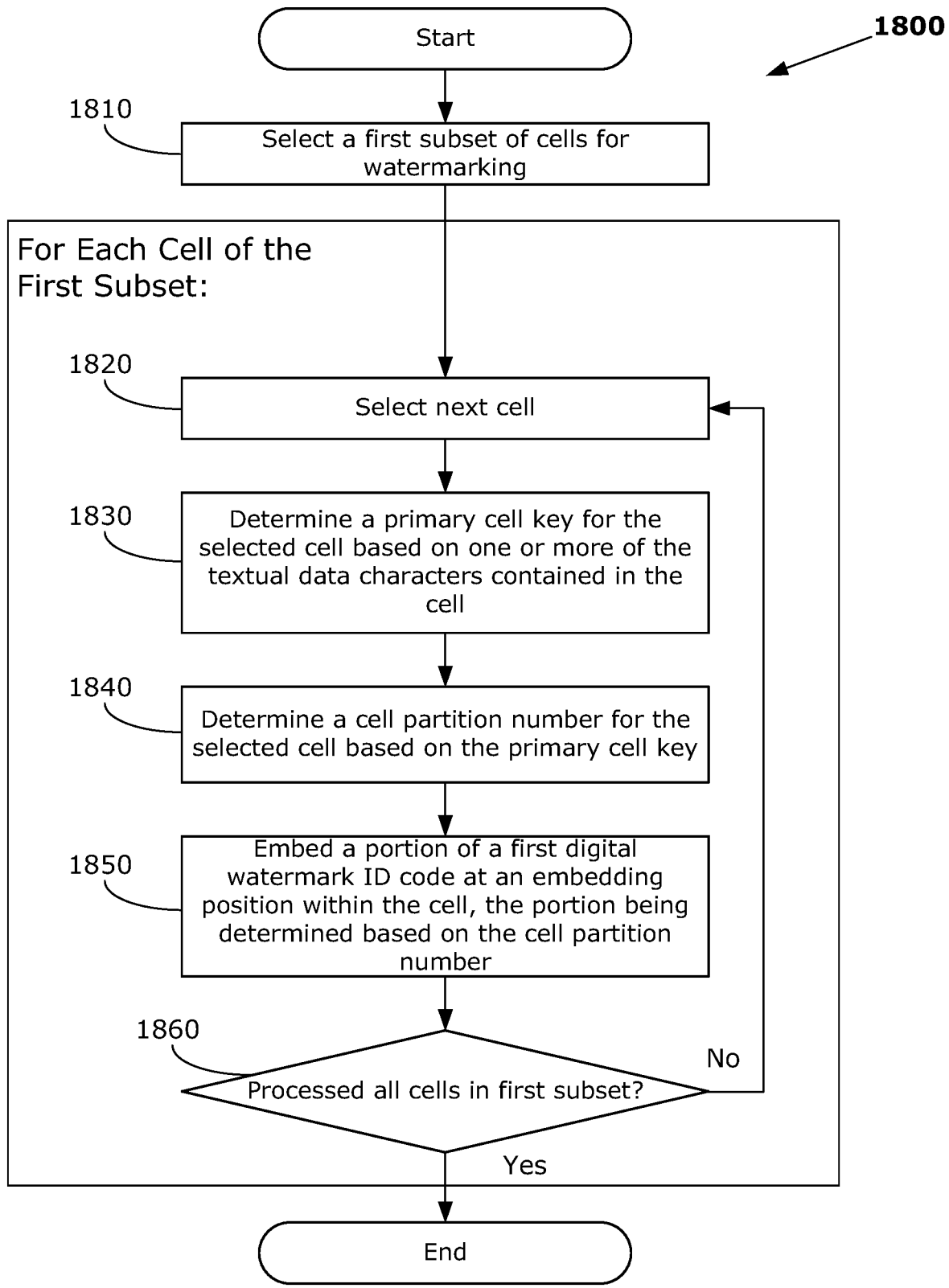
FIG. 18 is a flow chart depicting the steps for embedding a digital watermark information into textual data that is arranged in a table of cells that each contain a respective set of textual data structures, in accordance with example embodiments of the present disclosure.

FIG. 18 depicts a method 1800 for embedding a digital watermark in structured textual data arranged in cells of a table, in accordance with example aspects of the present disclosure. The method starts at 1810 wherein a first subset of cells are selected for watermarking. For each cell of the selected subset the steps 1820 to 1850 are carried out until all cells are processed. At step 1820 a cell is selected. At 1830 a primary cell key is determined for the selected cell. The primary cell key is based on one or more of the textual data characters contained in the cell. At 1840, a cell partition number is determined for the selected cell. The cell partition number is based on the primary cell key. At step 1850, a portion of a first digital watermark code is embedded at an embedding position within the cell. The portion of the first digital watermark code is determined based on the cell partition number. At step 1860, it is checked whether all cells of the first subset have been processed. If some cells have not been processed, then control goes back to step 1820 where a new cell is selected. If all cells have been processed then the method ends.

Figure 19:
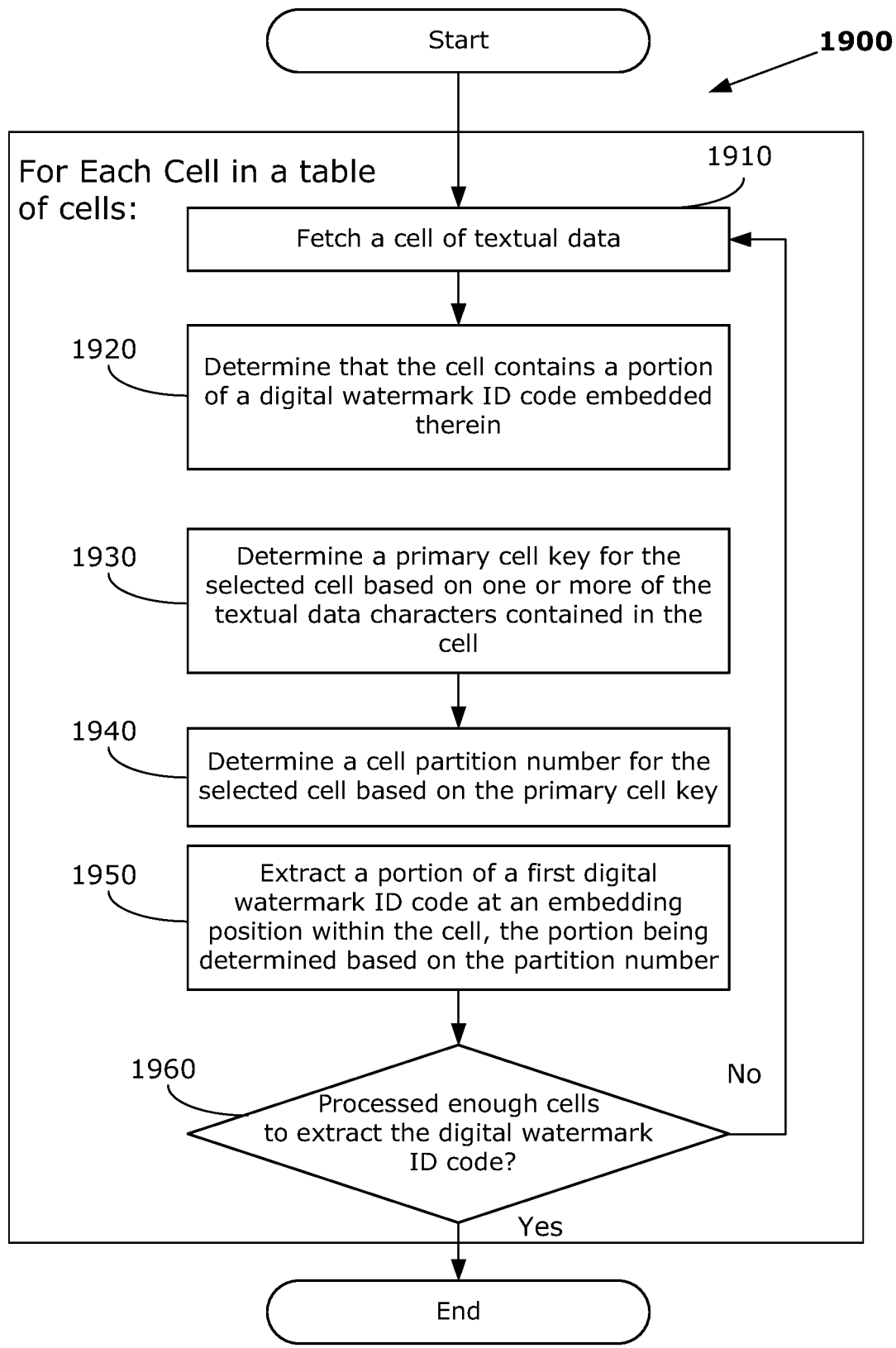
FIG. 19 is a flow chart depicting the steps for extracting digital watermark information from textual data that is arranged in cells that each contain a respective set of textual data characters, in accordance with example embodiments of the present disclosure.

FIG. 19 depicts a flow chart of a method 1900 for extracting a digital watermark ID code from a table of cells of structured textual data, in accordance with example aspects of the present disclosure. For each cell in the table of cells the steps 1910 to 1950 are carried out. When the digital watermark ID code is determined, the method ends. At step 1910 a cell of textual data is fetched from the table. At step 1920, it is determined whether the cell contains a portion of a digital watermark ID code embedded therein. At step 1930, a cell primary key for the cell is determined. The cell primary key is based on one or more of the textual characters contained in the cell. At step 1940, a cell partition number is determined for the fetched cell based on the primary cell key. At step 1950, a portion of a first digital watermark ID code is extracted at an embedding position within the cell. The portion of the first digital watermark ID code is determined based on the cell partition number. At step 1960 it is checked whether the digital watermark ID code has been determined. If the first digital watermark ID code has been determined, then the method ends. If the first digital watermark ID code has not been determined, then another cell is fetched at 1910 and the steps 1910 to 1950 are repeated.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to

The invention claimed is:

1. A computer-implemented method for embedding digital watermark information into textual data stored in memory of a computing system, the textual data being arranged in a table of cells, each cell containing a respective set of textual data characters, the cells being arranged in an array of columns and rows, the method comprising:
   selecting a first subset of rows of the cells in the array for watermarking, wherein each of the cells in the rows of the selected subset of rows are included in a first subset of the cells; and
   for each of the cells in the first subset of cells:
      determining a primary cell key for the cell based on one or more of the textual data characters contained in the cell;
      determining a cell partition number for the cell based on the primary cell key;
      embedding a portion of a first digital watermark ID code at an embedding position within the cell, the first digital watermark ID code being comprised of a plurality of invisible characters, the portion being determined based on the cell partition number and including at least one of the plurality of invisible characters, the embedding the portion of the first digital watermark ID code including inserting the portion of the first digital watermark ID code into the textual data characters contained in the cell; and
      inserting a noise column in the table, the noise column comprising a plurality of cells each containing the first digital watermark ID code in encrypted form.

2. The computer-implemented method of claim 1, wherein, for each of the cells in the first subset of cells, the primary cell key is determined based on a combination of at least one of the textual data characters contained in the cell and the number of textual data characters contained in the cell.

3. The computer-implemented method of claim 1, wherein, for each of the cells in the first subset of cells, the cell partition number for the cell is determined also based on a secret key that is common for all of the cells in the first subset of cells.

4. The computer-implemented method of claim 3, further comprising, for each of the cells in the first subset of cells, determining the embedding position within the cell based on the secret key and the length of the textual data in each cell.

5. The computer-implemented method of claim 1, wherein the first digital watermark ID code comprises a plurality of visible characters, the portion of the first digital watermark ID code comprises at least one of the plurality of visible characters, and embedding the portion of the first digital watermark ID code comprises replacing a portion of the textual data characters contained in the cell with the portion of the first digital watermark ID code.

6. The computer-implemented method of claim 5, further comprising, for each of the cells in the first subset of cells, replacing the last character of the textual data characters in the cell with a noise key character selected based on the cell partition number from a noise key index that is common for all of the cells in the first subset of cells.

7. The computer-implemented method of claim 1, further comprising:
   selecting a second subset of the cells for watermarking; and
   for each of the cells in the second subset of cells:
      determining a primary cell key for the cell based on one or more of the textual data characters contained in the cell;
      determining a cell partition number for the cell based on the primary cell key;
      embedding a portion of a second digital watermark ID code at an embedding position within the cell, the portion being determined based on the cell partition number,
   wherein the first digital watermark ID code and the second digital watermark ID code each map to a same authorized recipient identifier.

8. A computer system comprising a processor and a non-transitory memory coupled to the processor, the memory storing machine-readable instructions that, when executed by the processor, configure the computer system to perform the method of claim 1.

9. A computer program product comprising a non-transitory computer medium storing machine-readable instructions for configuring a computer system to perform the method of claim 1.

10. A method for extracting digital watermark information from textual data stored in memory of a computing system, the textual data being arranged in a table of cells, each cell containing a respective set of textual data characters, the cells being arranged in an array of columns and rows, the method comprising:
    selecting a first subset of rows of the cells in the array, wherein each of the cells in the rows of the selected subset of rows are included in a first subset of the cells,
    fetching a cell from the first subset of cells of the textual data;
    determining that the cell contains a portion of a digital watermark ID code embedded therein;
    determining a primary cell key for the cell based on one more of the textual data characters contained in the cell;
    determining a cell partition number for the cell based on the primary cell key;
    extracting a portion of a first digital watermark ID code at an embedding position within the cell, the first digital watermark ID code being comprised of a plurality of invisible characters, the portion being determined based on the cell partition number and including at least one of the plurality of invisible characters, the embedding the portion of the first digital watermark ID code including inserting the portion of the first digital watermark ID code into the textual data characters contained in the cell;
    extracting and decrypting the first digital watermark ID code from a noise column in the table; and
    repeating the above steps for other cells in the first subset of cells until the digital watermark ID code is fully extracted.

11. The method of claim 10, wherein the first digital watermark ID code is comprised of a plurality of visible characters, the method further comprising:
    determining that the cell contains the portion of the digital watermark is embedded therein comprises locating a noise key character at a predetermined position, the noise key character selected, based on the cell partition number, from a noise key index that is common for all of the cells.

12. The method of claim 10, wherein the first digital watermark ID code is comprised of a plurality of invisible characters, the method further comprising:
    determining that the cell contains the portion of the digital watermark is embedded therein comprises locating the portion of the first digital watermark ID code corresponding to the cell partition number at the embedding position.

13. The method of claim 10, wherein the primary cell key is determined based on a combination of at least one of the textual data characters contained in the cell and the number of textual characters contained in the cell.

14. The method of claim 10, wherein the cell partition number is determined also based on a secret key that is common to all of the cells.

15. The method of claim 14, further comprising:
   determining the embedded position within the cell based on the secret key and the length of the textual data in the cell.

16. The method of claim 10, further comprising:
   locating a noise column in the table, the noise column comprising a plurality of cells each containing first digital watermark ID code in encrypted form; and
   decrypting the first digital watermark ID code to extract the first digital watermark ID code.

17. A computer system comprising a processor and a non-transitory memory coupled to the processor, the memory storing machine-readable instructions that, when executed by the processor, configure the computer system to perform the method of claim 10.

18. A computer program product comprising a non-transitory computer medium storing machine-readable instructions for configuring a computer system to perform the method of claim 10.

\* \* \* \* \*